United States Patent [19]
Watanabe et al.

[11] Patent Number: 5,951,368
[45] Date of Patent: Sep. 14, 1999

[54] POLISHING APPARATUS

[75] Inventors: Katsuhide Watanabe, Fujisawa; Noburu Shimizu, Yokohama; Ichiju Satoh, Fujisawa, all of Japan

[73] Assignee: Ebara Corporation, Tokyo, Japan

[21] Appl. No.: 08/864,906

[22] Filed: May 29, 1997

[30] Foreign Application Priority Data

May 29, 1996 [JP] Japan .................................. 8-158961

[51] Int. Cl.⁶ .................................................. B24B 1/00
[52] U.S. Cl. ................................. 451/5; 451/9; 451/10; 451/41; 451/288; 451/63
[58] Field of Search ............................. 451/5, 9, 10, 41, 451/285–290, 63

[56] References Cited

U.S. PATENT DOCUMENTS

| | | | |
|---|---|---|---|
| 5,133,158 | 7/1992 | Kihara et al. | 451/11 |
| 5,205,078 | 4/1993 | Takara et al. | 451/11 |
| 5,562,528 | 10/1996 | Ueyama et al. | 451/11 |
| 5,567,199 | 10/1996 | Huber et al. | 451/285 |
| 5,573,443 | 11/1996 | Yasuda et al. | 451/28 |
| 5,643,056 | 7/1997 | Hirose et al. | |
| 5,730,642 | 3/1998 | Sandhu et al. | 451/286 |

FOREIGN PATENT DOCUMENTS

| | | |
|---|---|---|
| 00100 | 8/1993 | Japan . |
| 7-112362 | 5/1995 | Japan . |

OTHER PUBLICATIONS

Pending U.S. Patent Application No. 08/684,941, filed Jul. 19, 1996, entitled "Polishing Apparatus", located in Group Art Unit 3723, by Noburu Shimizu, allowed Jun. 8, 1998 (Batch No. F03).

*Primary Examiner*—Robert A. Rose
*Assistant Examiner*—George Nguyen
*Attorney, Agent, or Firm*—Wenderoth, Lind & Ponack, L.L.P.

[57] ABSTRACT

The polishing apparatus can control the attitude of the top ring with respect to a surface of a turntable of a polishing apparatus is controlled so as to provide a uniform polish surface pressure across the entire polish surface. The polishing apparatus includes the turntable having an abrading surface, a top ring for holding an object to be polished to keep the object surface in moving contact with the abrading surface while rotating the turntable and the top ring, a magnetic bearing assembly for supporting a rotation shaft of the top ring by means of a thrust bearing device and at least one radial bearing device, and an attitude controller for controlling an orientation of the top ring with respect to the turntable through the magnetic bearing assembly.

49 Claims, 20 Drawing Sheets

EXPERIMENTAL TRAIL

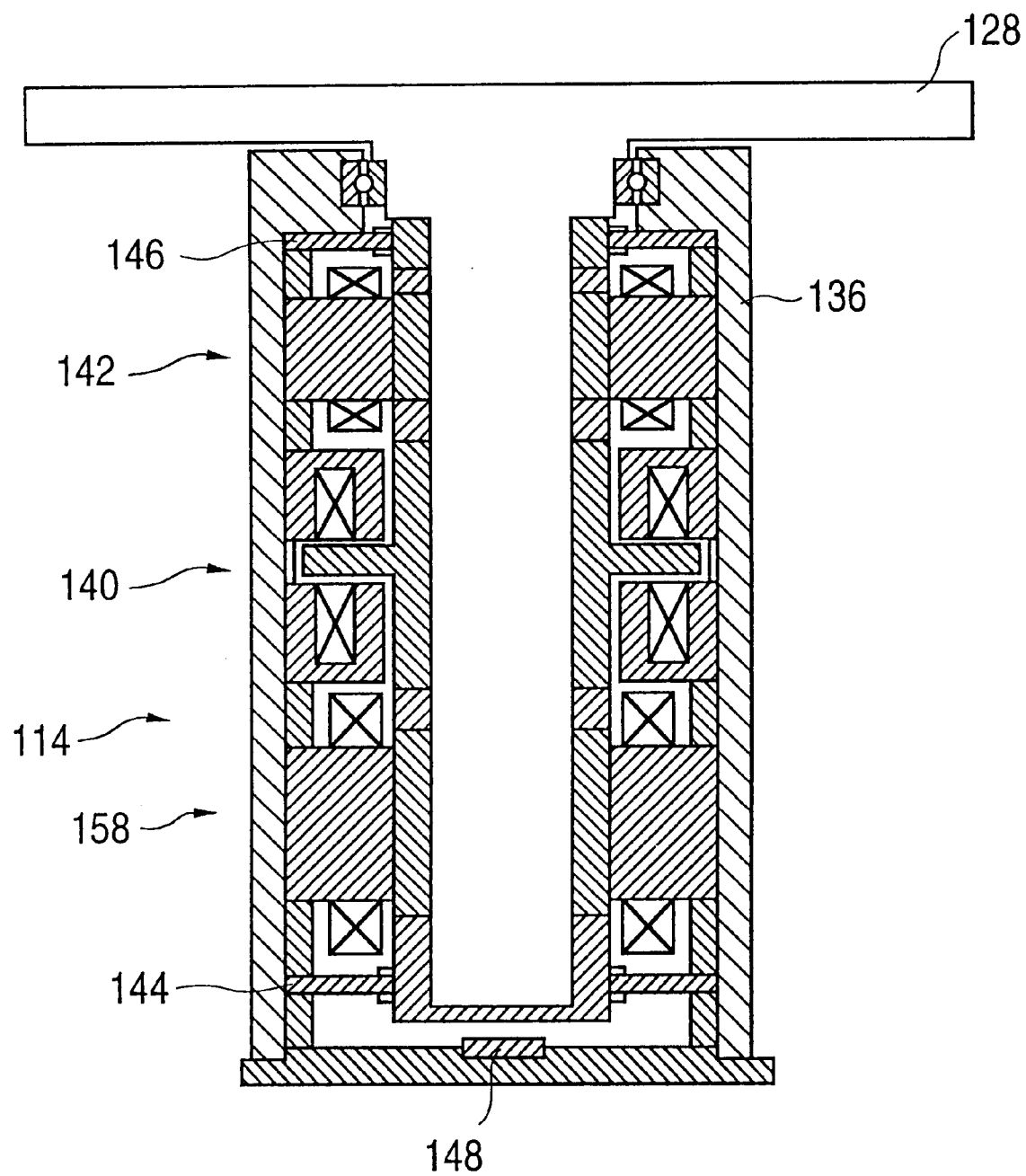

POLISHING APPARATUS

BACKGROUND OF THE INVENTION

1. Field of the Invention

The present invention relates to a polishing apparatus, and relates in particular to a polishing apparatus having a top ring or pedestal having a rotation shaft is supported by a magnetic bearing.

2. Description of the Prior Art

In recent years, there has been a remarkable progress in the density of integrated circuit devices leading to a trend of narrowing interline space. In the case of using an optical lithography process involving less than 0.5 $\mu$m line spacing particularly, the shallow depth of focus is associated to demand that the focusing plane of the stepper device be highly flat. Furthermore, if there is a particle of a size larger than the interline spacing, problems of electrical short circuiting can occur; therefore, both flatness and cleanliness are important considerations in device fabrication. Such considerations apply equally to glass substrates used in masking or to liquid crystal display panels.

A conventional polishing apparatus, shown in FIG. 19, comprises a turntable 2 having a polishing device (polishing pad) 1 mounted on the top surface and a top ring 3 holding an object to be polished such as semiconductor wafer W. The turntable 2 and the top ring 3 are provided with their own rotation drivers so as to be independently rotated, along with a pressing device sucn as an air cylinder to press the wafer onto the polishing pad.

Such a polishing apparatus is operated by placing the top ring 3 in such a way that the edge of a wafer W is positioned at a certain distance away from the center and the edge of the turntable 2, and by pressing the wafer W towards the turntable while rotating the turntable 2 and the top ring 3 at independent speeds and supplying a polishing solution Q from a nozzle 4. The aim is to polish the entire surface of the wafer W uniformly.

The top ring 3 is a disc shaped member holding object W on its underside holding surface by suction, for example, and it is attached to its support shaft 5 at a joint section providing universal coupling by means of a sphere 6. This structural arrangement allows tilting of the top ring 3 in response to the force exerted by the turntable 2 so as to compensate for any misalignment between the top ring 3 and the turntable 2 or local variations in the polishing pad 1 so that polishing can be carried out consistently.

However, such a conventional polishing technique presents a problem that a pressing pressure between the abrading surface (pad surface) of the turntable 2 and the object W tends to be non-uniform across the surface so that it is difficult to obtain a uniform removal rate across the surface of the object W. This will be examined more closely below in terms of the relative motions of the object W held in the top ring 3 and the polishing pad 1 on the turntable 2.

The amount of material removed by polishing is given by a relation:

$$Qp = \eta \times P \times V \times T$$

where Qp is removal rate; $\eta$ is a constant; P is a polishing pressure; V is a relative speed (between object surface of the wafer and the turntable); and T is a polishing duration. Therefore, applying uniform pressure in the polishing area is one of the important factors to obtain a uniform removal rate within the polished surface.

However, as shown in a schematic drawing presented in FIG. 20A, there is a force of friction "f" acting at the polish surface (given by f=mN where N is the load on the object W and m is the coefficient of friction) which generates a rotational moment M around the sphere 6. This arrangement produces tilting of the top ring 3, as illustrated in FIG. 20B, resulting in a phenomenon of "plunging" of the leading edge portion of the object W into the surface layer of the polishing pad 1 as illustrated in FIG. 20C. As shown in FIG. 20B, the angle $\theta$ of tilting is actually determined by the action of the sphere 6 according to a relation between the pressing force N and the frictional force f.

As shown in FIG. 20D, tilting of the top ring 3 produces a non-uniform distribution of polish surface pressure so as to course the pressure at the edge portion to be higher than in the rest of the object W. Because the object W is also rotated, the removal rate distribution becomes one that is illustrated in a graph shown in FIG. 20E. The polish surface pressure to obtain a uniform material removal rate across the object surface of the object W, is also influenced by the softness of the pad and the flow conditions of the polishing solution. Therefore, angle $\theta$ should not necessarily be equal to zero. However, the angle $\theta$ which is determined as the result of reaction of the sphere 6 to various forces acting on the top ring 3, as mentioned above, is not necessarily the optimum angle which would produce uniform polish surface pressure.

Also, according to the conventional technique, since the tilt angle $\theta$ is determined by a result of the reaction of the sphere 6, the possibility existed that consistent polishing is not produced due to local variations in the surface conditions existing at the polish surface of the polishing pad, which may lead to vibration of the top ring to cause further unsteadiness. As a result, as shown in FIG. 20E, more material is removed from the peripheral region than in the central region of the wafer.

Also, in recent years, an alternative type of apparatus has been proposed, which comprises a cylindrical rotating drum having an outer abrading surface. The apparatus applies a line pressure on the wafer, provided by a line contact of the outer periphery of the cylindrical rotating drum with the polished surface of the wafer. While the drum and the wafer are made to undergo relative movement, a polishing solution is supplied to the contacting surfaces to produce a mirror polished surface.

Such rotating drum type apparatus enables the use of more compact polishing tools, compared with the turntable type apparatus, and as a result, the polishing apparatus can also be made more compact. Also, because this approach makes it possible to directly observe the condition of the surface being polished, the amount of material removed or the film thickness remaining on the wafer being polished can be determined on a real time basis.

In the drum type apparatus, the workpiece and the polishing tool are moved relative to each other during the polishing process so as to obtain uniform material removal over the entire object surface of the workpiece. However, the contact length between the polishing tool and the workpiece can vary while undergoing such relative movement; for example, in polishing a circular object such as a semiconductor wafer, the pressing pressure becomes higher in the outer peripheral region of the wafer, resulting in an increased removal rate, to cause a so-called "turned-down edge" phenomenon.

This phenomenon is caused by the fact that the apparatus is operated under a constant pressing load. Also, pressing devices, such as fluid operated cylinders, are not suitable for controlling such pressing pressure because of insufficient response speed and precision due to the presence of fluid pressure adjusting valves, the volumetric effect of the cylinder device and the sliding parts between the cylinder piston and the pressure seals.

SUMMARY OF THE INVENTION

It is an object of the present invention to provide a polishing apparatus to enable control of the attitude of the top ring with respect to the surface of the turntable so as to provide a uniform polish surface pressure across the entire polish surface.

A second object of the present invention is to provide a rotating drum type polishing apparatus to obtain its mechanical advantages while improving its performance disadvantages such as non-uniform pressing pressure over a given shape of an object surface.

The first object is achieved by a polishing apparatus for polishing an object surface of an object comprising: a turntable having an abrading surface; a top ring for holding the object to keep the object surface in moving contact with the abrading surface while rotating the turntable and the top ring; a magnetic bearing assembly for supporting a rotation shaft of the top ring by means of a thrust bearing device and at least one radial bearing device: and an attitude controller for controlling an orientation of the top ring with respect to the turntable by the magnetic bearing assembly.

Accordingly, by controlling the attitude of the top ring holding the polishing object with respect to the turntable by means of a magnetic bearing device, polishing is carried out under a uniform distribution of polish surface pressures so as to provide a highly flat polished surface.

If the abrading surface is a grinding stone which has negligible elasticity, the object surface and the abrading surfaces should be perfectly parallel during the polishing process to obtain good results. If the polishing surface contains soft material such as a polishing pad, then suitable tilt angle, depending on the polish surface pressure and relative polishing speeds, should be determined.

Usually, the tilt angle along the moving direction of the turntable is controlled. This tilt angle should be determined so as to avoid the "plunging" phenomenon, or to cancel the force generated by the "plunging" phenomenon so that the polish surface pressure distribution is uniform. The tilt angle can be controlled by output signals from displacement sensors of thrust and radial magnetic bearing devices in the magnetic bearing assembly.

In the present invention, the polish surface pressure can be controlled so that, in addition to controlling the distribution of the polish surface pressure, it is also possible to control the magnitude of the pressure itself at a proper value. The polish surface pressure is estimated from changes in the load current through the bearings. By controlling the excitation current to the thrust bearing, the polish surface pressure may also be controlled. An elevator device may also be used to control the polish surface pressure. The polish surface pressure can be pre-determined by trial polishing operations.

Another embodiment of the present invention is a method for producing a polished surface on an object by a polishing apparatus having a turntable with an abrading surface, a top ring for holding the object to keep an object surface in moving contact with the abrading surface while rotating the turntable and the top ring, and a magnetic bearing assembly having a thrust bearing device and at least one radial bearing device so as to magnetically suspend a rotation shaft of the top ring, wherein the method includes optimizing an attitude of the top ring with respect to the turntable by control of the magnetic bearing assembly.

The second object of the present invention is achieved by a polishing apparatus comprising: a drum that is rotatable and having a polishing section mounted on an outer surface of the drum; a pedestal member holding an object surface of an object to face towards the drum; a pressing device for pressing the drum relatively to the object; a driving device for rotating the drum; a moving device to relatively move the drum and the pedestal member in a plane parallel to the object surface, wherein the pressing device is provided with a magnetic bearing device for rotatably supporting the pedestal member.

Accordingly, by simply altering electric current flowing in a coil of the magnetic bearing, polishing parameters, such as pressing pressure and tilting between the drum and the polishing object, can be controlled quickly and accurately, thereby making it possible to retain the highly responsive character needed for a drum type polishing apparatus and to exercise precise control over the pressing pressure and/or orientation of the drum with respect to the object. Improvements in polishing performance have thus been attained while retaining the advantages of compactness, ease of maintenance and visual observation of the polishing process of the drum type polishing apparatus. The pressing device also may be provided for pressing the drum relative to the object. In this case, the pressing device may be provided with a magnetic levitation device for linearly movably supporting the drum, as well as a magnetic bearing device for rotatably supporting the drum.

BRIEF DESCRIPTION OF THE DRAWINGS

FIG. 14 is a vertical cross sectional view of another embodiment of the polishing apparatus.

DESCRIPTION OF THE PREFERRED EMBODIMENTS

In the following, preferred embodiments of the polishing apparatus will be presented with reference to the drawings.

Figure 1:
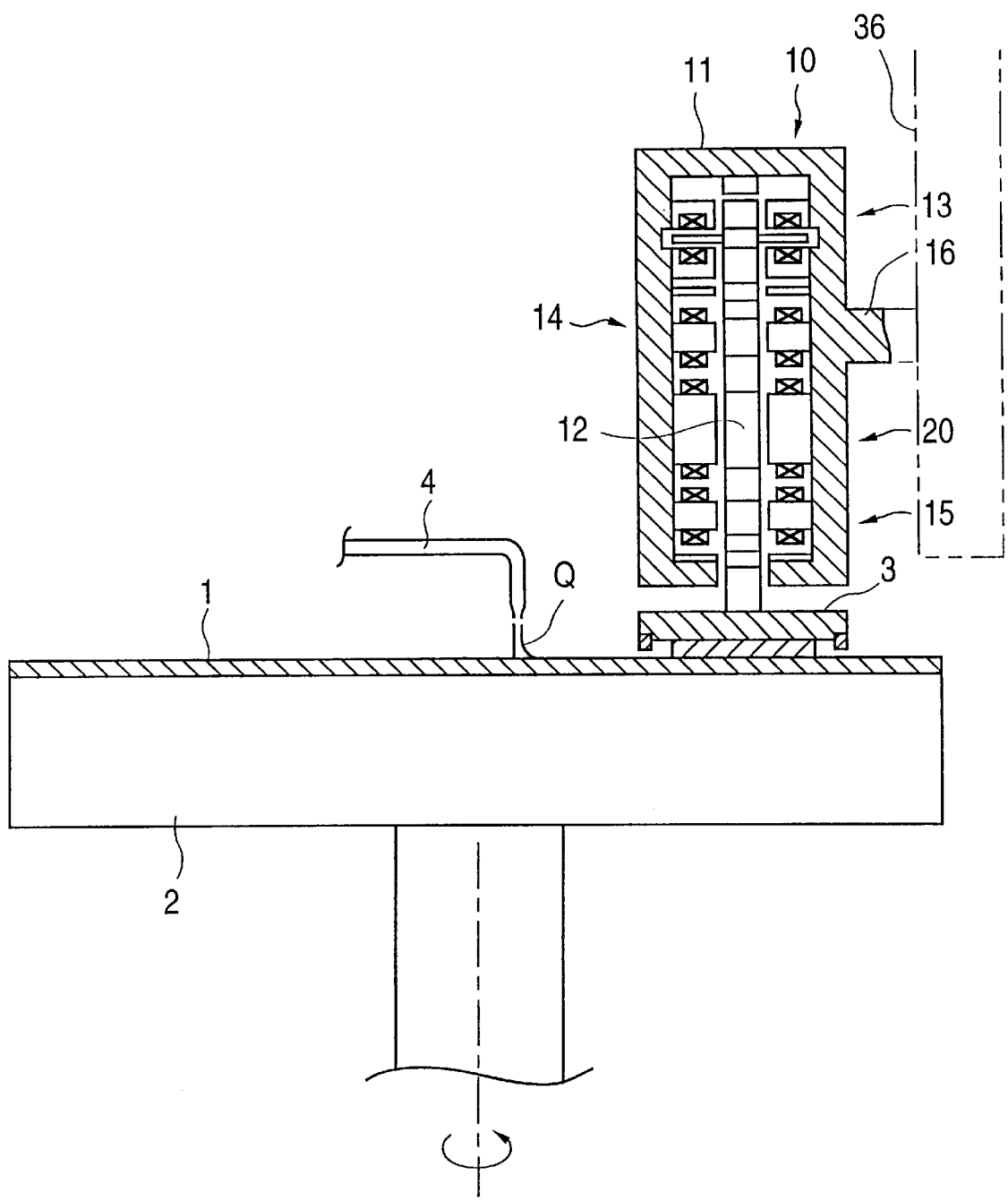
FIG. 1 is a schematic cross sectional view of a polishing apparatus of a first embodiment according to the present invention.

FIG. 1 shows an embodiment of the polishing apparatus comprising a turntable 2 having a polishing pad 1 or a grind stone mounted on its top surface, and a top ring 3 for holding an object to be polished (semiconductor wafer) W. The turntable 2 has a driving device (not shown) for rotating the turntable independently of the top ring.

The top ring 3 is supported by a magnetic bearing assembly 10, where a rotation shaft 12 of the top ring 3 is housed in the interior of a casing 11, and the following devices are provided to support the rotation shaft 12 non-contactingly. Such devices are, from the top: a thrust bearing 13, an upper radial bearing 14; and a lower radial bearing 15. A thrust displacement sensor 17 (FIG. 2) is provided to detect vertical displacement of the rotation shaft 12, and radial displacement sensors 18, 19 are provided to detect displacements in the horizontal directions. A drive motor 20 is disposed between the upper radial bearing 14 and the lower radial bearing 15, and the magnetic bearing assembly 10, including the drive motor 20, is supported by an external elevator device 36 attached to the casing 11 through a support arm 16. The elevator device may be in the form of a feed screw having a precision positioning capability or an air cylinder arrangement.

Figure 2:
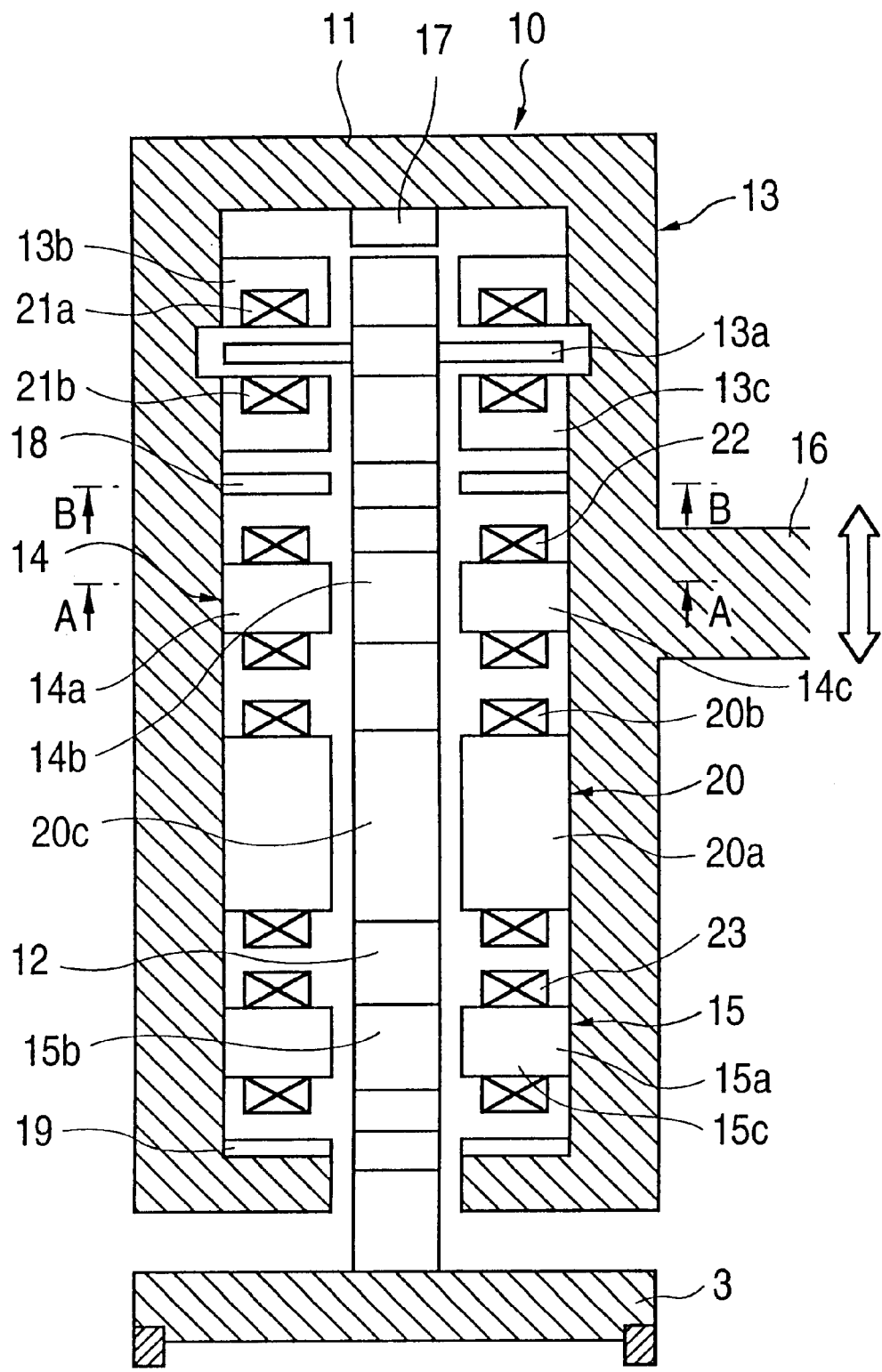
FIG. 2 is a cross sectional view of a magnetic bearing device shown in FIG. 1.

FIG. 2 shows an enlarged view of the top ring shown in FIG. 1. The magnetic thrust bearing 13 comprises a thrust disc 13a fixed on the rotation shaft 12; and electromagnetic cores 13b, 13c having a pair of upper and lower coils 21a, 21b and fixed to the casing 11. The upper and lower radial bearings 14, 15 comprise electromagnetic cores 14a, 15a, each having eight magnetic poles 14c, 15c extending from the inside surface of the casing 11 towards the interior of the magnetic device 10 and rotor magnetic poles 14b, 15b fixed on the rotation shaft 12. Adjacent pairs of the electromagnetic cores 14a, 15a across the X- or Y axis share a common coil 22, 23, respectively.

The structural configuration of the radial bearing device will be explained with reference to FIG. 3A, which is an orthogonal cross sectional view relative to the rotation shaft 12. The stator of the radial bearing 14 comprises a pair of electromagnetic coils comprising a coil 22a disposed in the positive direction of the X-axis, and an opposing coil 22b disposed in the negative direction of the X-axis. The rotor of the radial bearing 14 comprises a rotor magnetic pole 14b. The coils 22a, 22b are individually excited, and a balance in the attractive electromagnetic forces governs the position in the X-direction. Similarly, a pair of electromagnet coils 22c in the Y-direction and 22d in an opposite Y-direction are provided. The lower radial bearing 15 is also provided with an electromagnetic core 15a having eight magnetic poles 15c and their respective coils 23a, 23b, 23c and 23d, and a rotor magnetic pole 15b fixed on the rotation shaft 12.

Figure 3:
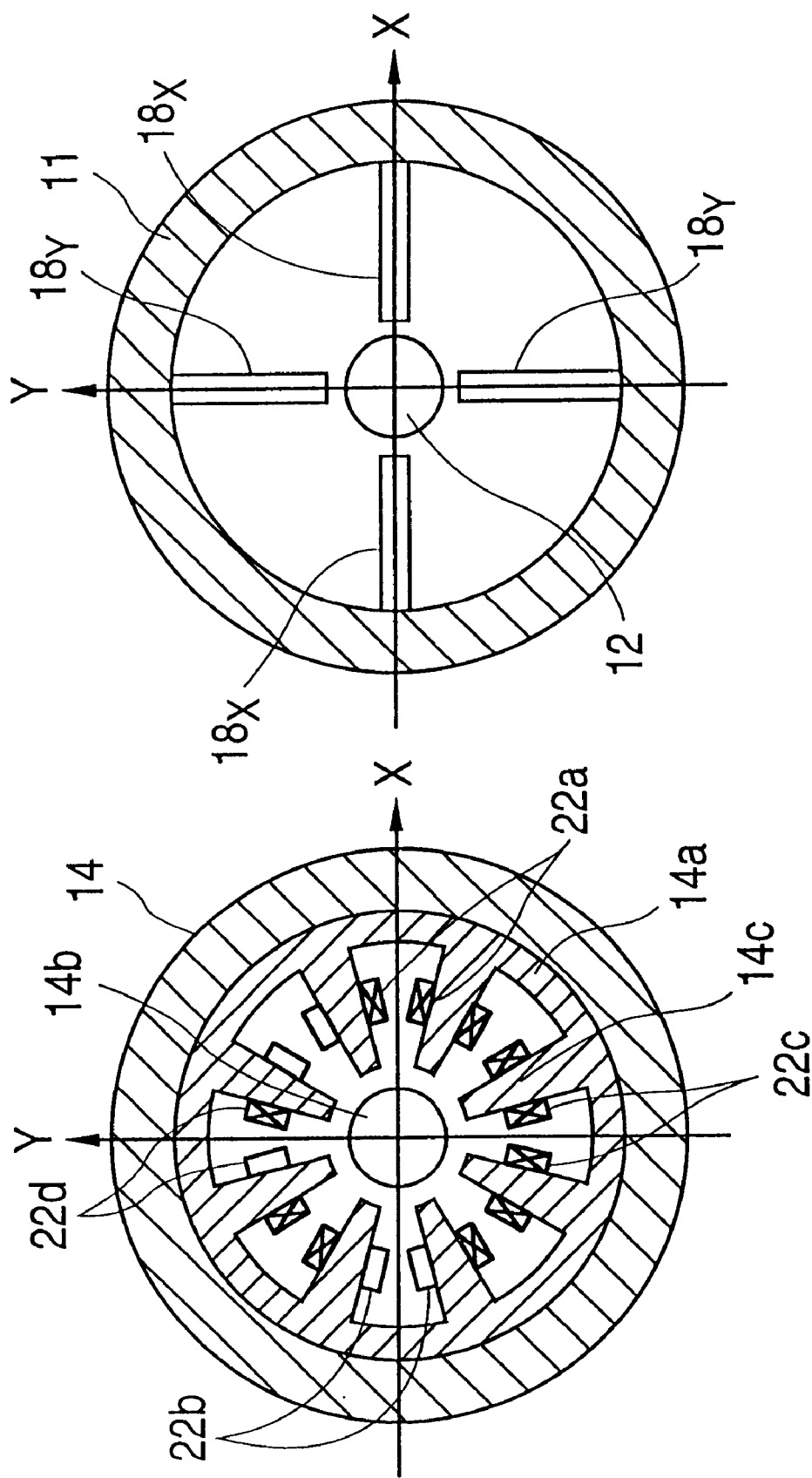
FIG. 3A is a sectional view along a line A—A in FIG. 2.
FIG. 3B is a sectional view along a line B—B in FIG. 2.

As shown in FIG. 3B, the radial displacement sensor 18 has a pair of radial displacement sensors 18x to detect movement in the X-direction and a pair of radial displacement sensor 18y to detect movement in the Y-direction. The drive motor 20 has a motor core 20a, a coil 20b and a motor rotor 20c.

Figure 4:
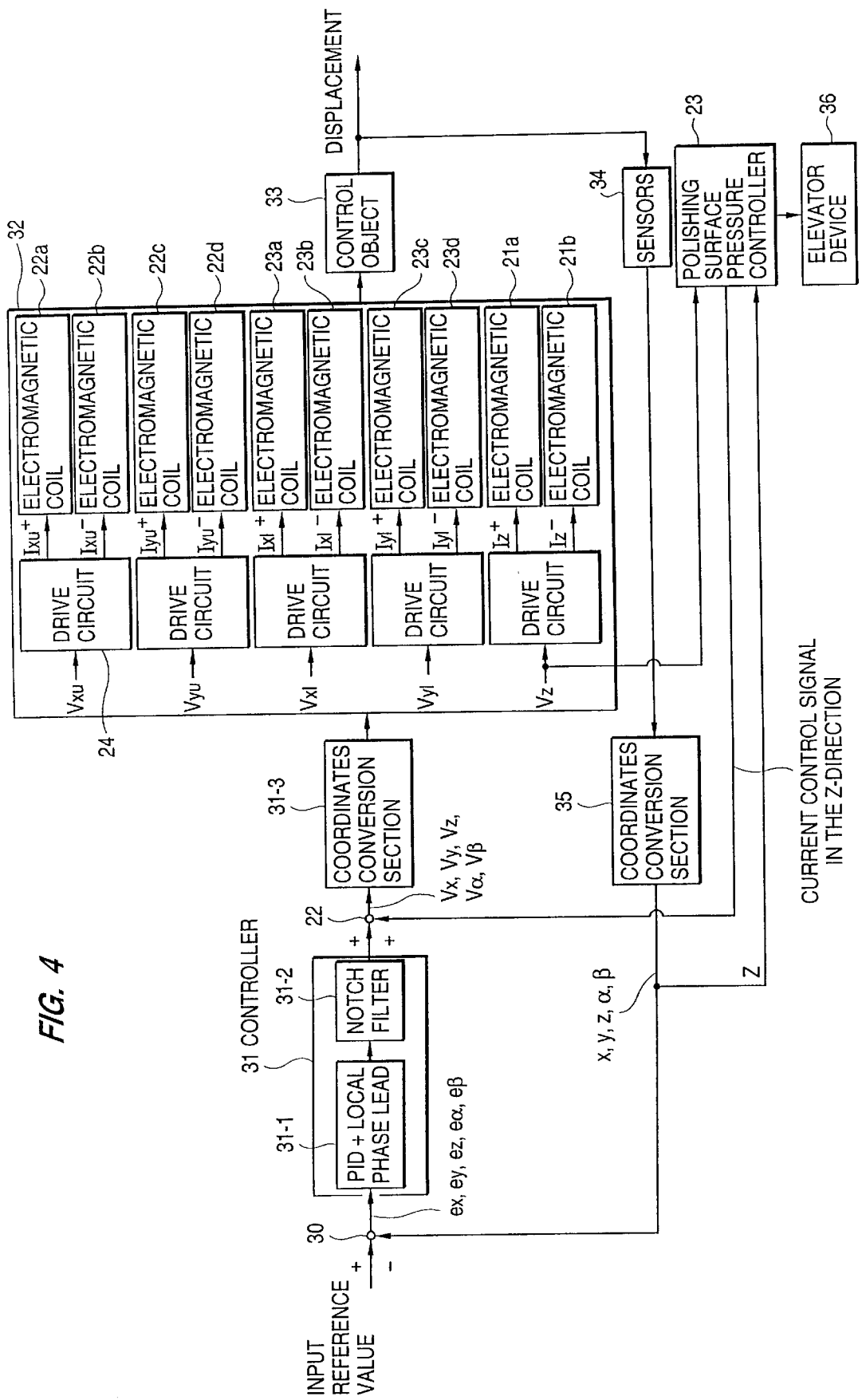
FIG. 4 is a block diagram of a control section for controlling the operation of a top ring.
Figure 5:
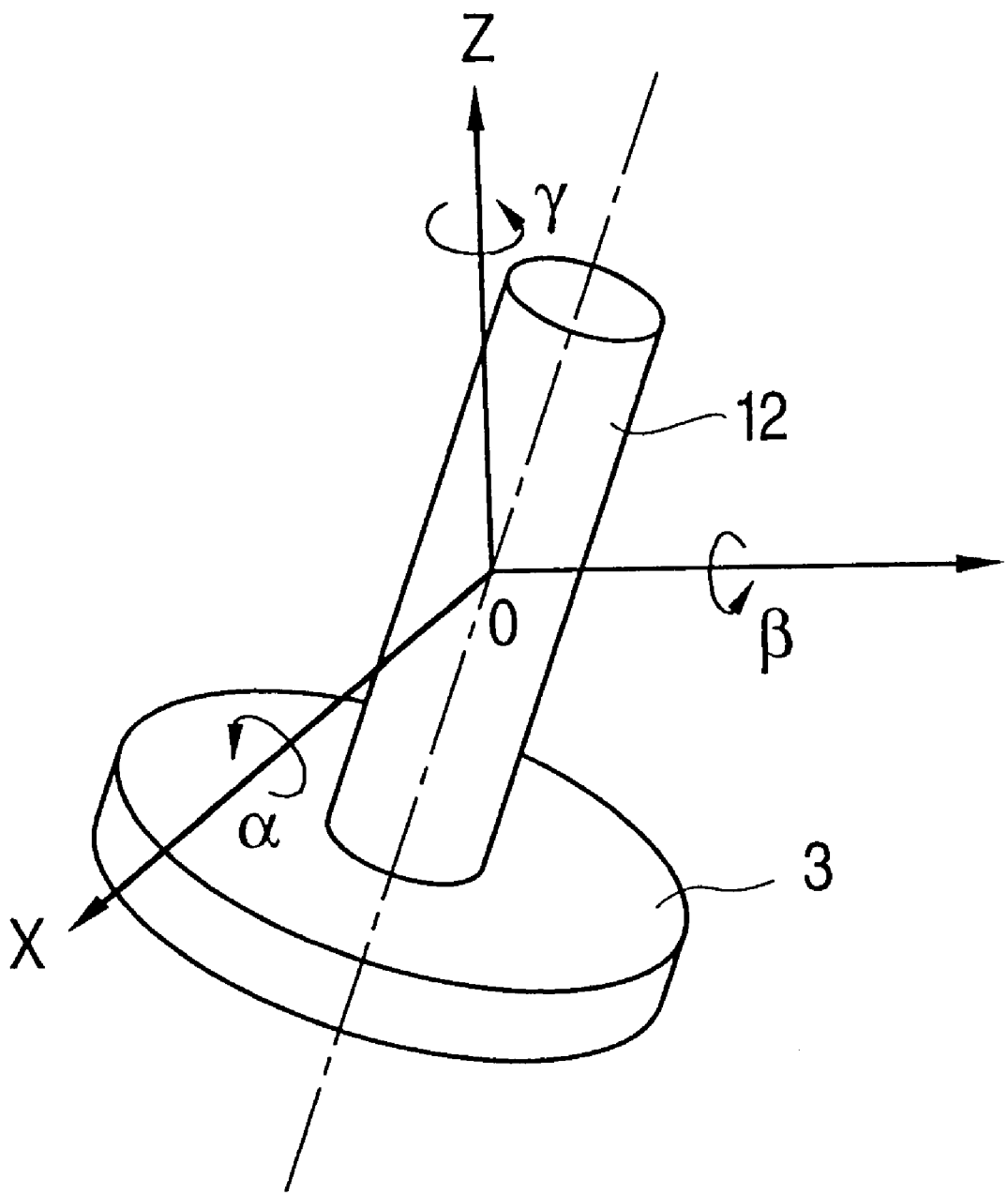
FIG. 5 is a perspective view showing tilt parameters $\alpha$, $\beta$ with respect to X-, Y- and Z-axes of a rotation shaft.

FIG. 4 is a block diagram of a controller section for controlling the operation of the polishing apparatus. The controller section includes a subtracter 30 and a controller 31. The subtracter 30 receives as input data a reference value for the position of the control object (e.g., rotation shaft 12), and current displacement values x, y, z, $\alpha$ and $\beta$ of the control object, generated in sensor section 34 (including radial displacement sensors 18, 19 and thrust displacement sensor 17) and converted in coordinates conversion section 35. The subtracter 30 outputs differential signals $e_x$, $e_y$, $e_z$, $e_\alpha$, $e_\beta$ from the reference values and the current values which are then entered into the controller 31. As shown in FIG. 5, X, Y and Z refer to displacements along the X-, Y- and Z-axes, respectively, and $\alpha$ and $\beta$ are tilt angles with respect to the X- and Y-axes, respectively.

With reference to FIG. 4, the differential signals $e_x$, $e_y$, $e_z$, $e_\alpha$, $e_\beta$ are processed in PID+local phase progression section 31-1 to undergo tilt/position controls and an attenuation process, are forwarded to pass through notch filter section 31-2 to filter out vibrational effects, and are converted into electrical voltage command signals $v_x$, $v_y$, $v_z$, $v_\alpha$, $v_\beta$. These signals are then input into coordinates conversion section 31-3 for conversion to control signals $v_{xu}$, $v_{yu}$, $v_{xl}$, $v_{yl}$, $v_z$ and are input into magnetic bearing driver section 32 for the radial bearings 14, 15 and the thrust bearing 13. Signal $v_z$ is also input into the polish surface pressure controller 23.

The magnetic bearing driver section 32 includes electromagnetic coils 22a, 22b, 22c, 22d, 23a, 23b, 23c, 23d, 21a, and 21b and driving circuits 24 for exciting these coils. The signals $v_{xu}$, $v_{yu}$, $v_{xl}$, $v_{yl}$, $v_z$ are input into respective driving circuits 24, and are converted into magnetic excitation current data $I_{xu+}$, $I_{xu-}$, $I_{yu+}$, $I_{yu-}$, $I_{xl+}$, $I_{xl-}$, $I_{yl+}$, $I_{yl-}$ to provide movement in the positive/negative directions for the radial bearings 14, 15; and $I_{z+}$ and $I_{z-}$ for vertical movement of the thrust bearing 13; and are supplied to the respective magnetic coils 22a, 22b, 22c, 22d, 23a, 23b, 23c, 23d, 21a, and 21b so as to control the attitude of the control object (e.g., rotation shaft 12).

The polish surface pressure controller 23 provides a fine control of the pressing force exerted by the top ring 3 against the turntable 2, and receives current control signals in the Z-direction, as well as input signals from the sensor section 34. The signals from the polish surface pressure controller 23 are output as pressing force control signals in the Z-direction, and are added to a signal $V_z$ by an adder 22 which follows the controller 31. The pressing force control signals from the polish surface pressure controller 23 are also input to the elevator device 36.

Figure 6:
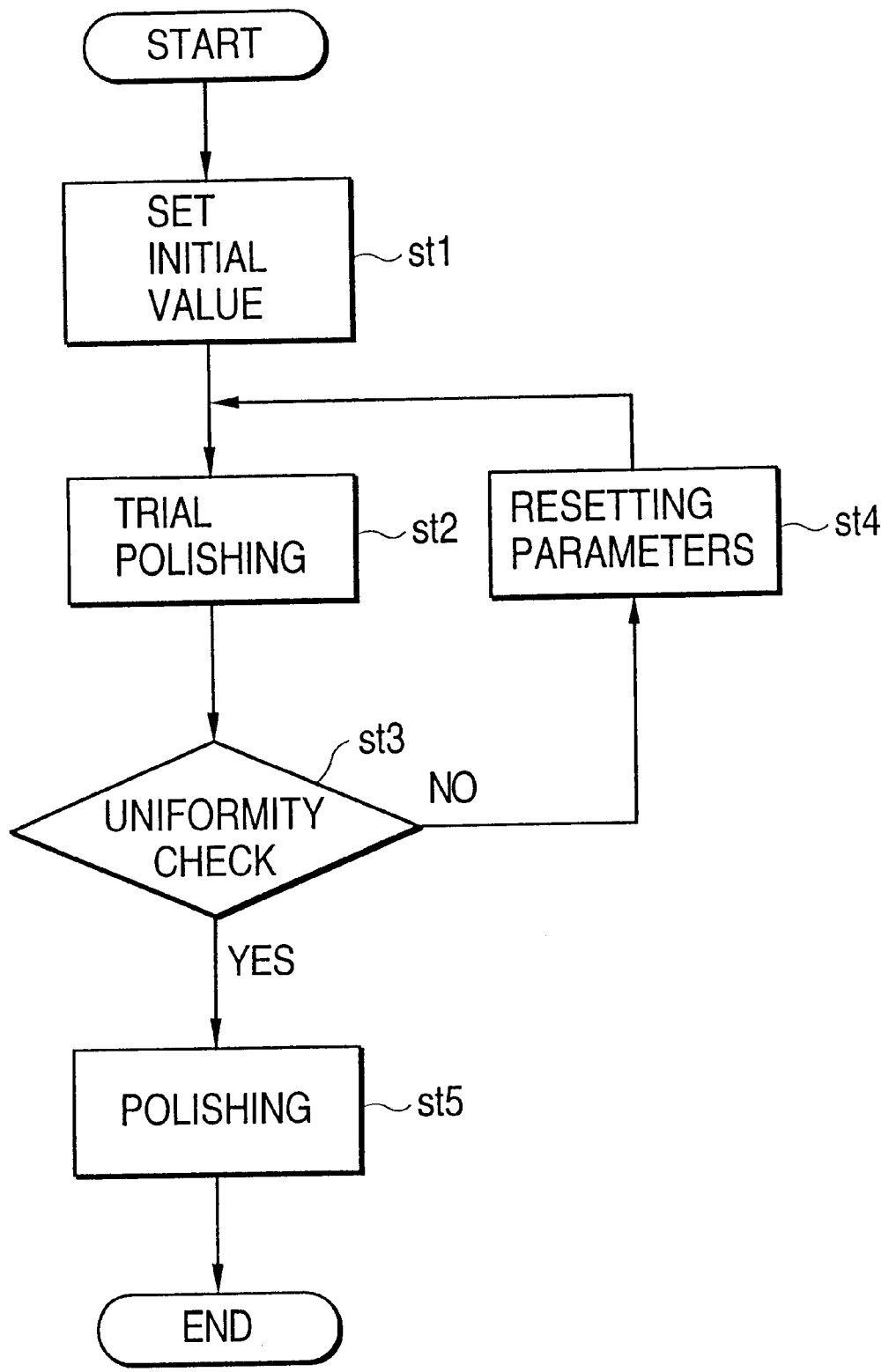
FIG. 6 is a flowchart for controlling the attitude of the polishing apparatus.
Figure 7:
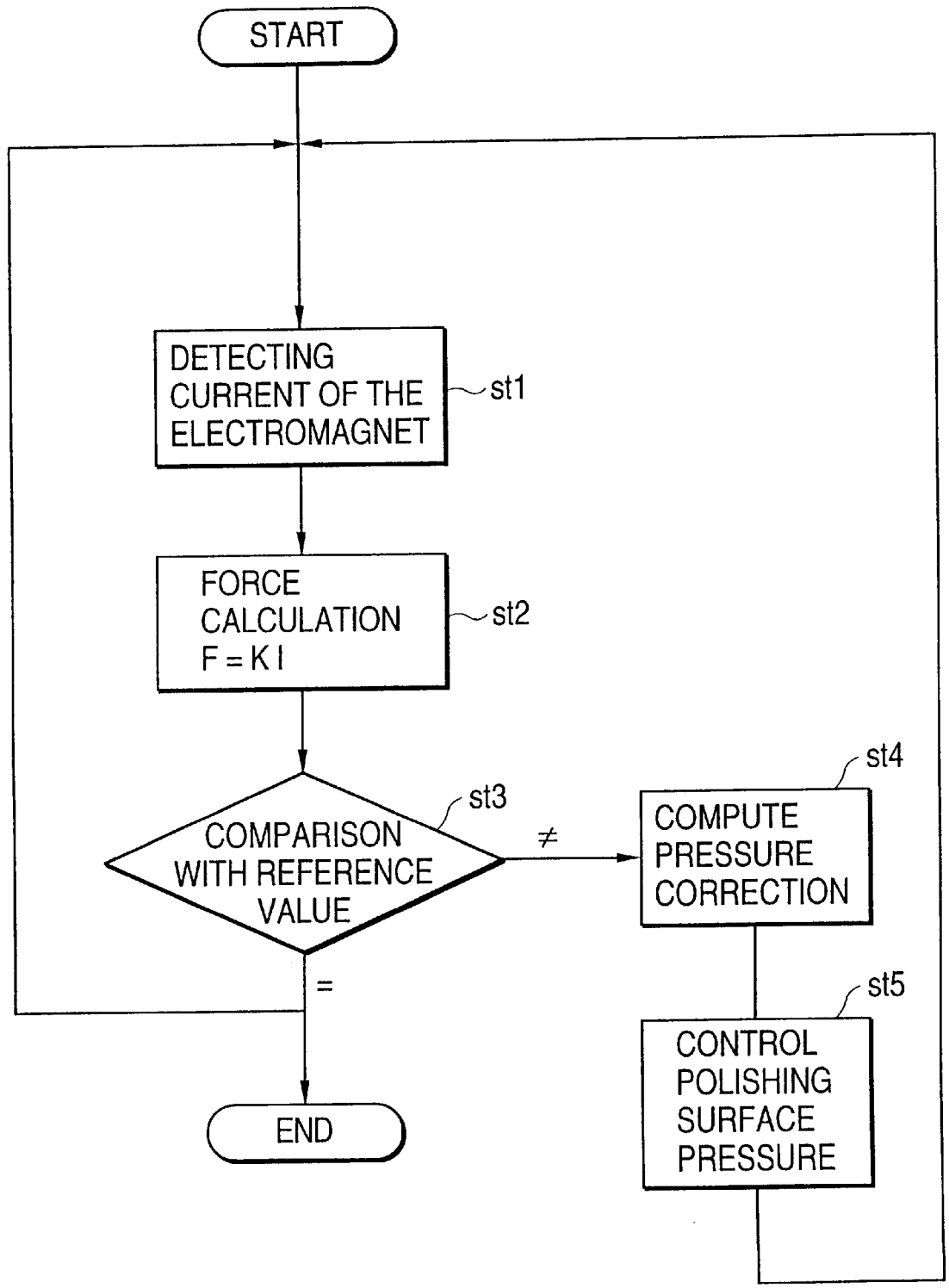
FIG. 7 is a flowchart for controlling the polish surface pressure of the polishing apparatus.

Next, a method of controlling the operation of the polishing apparatus will be explained with reference to flowcharts shown in FIGS. 6 and 7. First, the steps for adjusting the attitude of the top ring 3 will be explained with reference to FIG. 6. In the beginning, empirical initial parameters are entered (st1) and then trial polishing is performed (st2). Next, uniformity of the polished surface is evaluated by a suitable technique, and the results are examined to determine whether certain conditions for uniformity are satisfied (st3) If the conditions are not met, the parameters are re-entered (st4), and trial polishing is repeated. If a certain angle is found to satisfy the uniformity conditions, production polishing is carried out (st5) using this value of the parameter as a reference value.

Figure 9A:
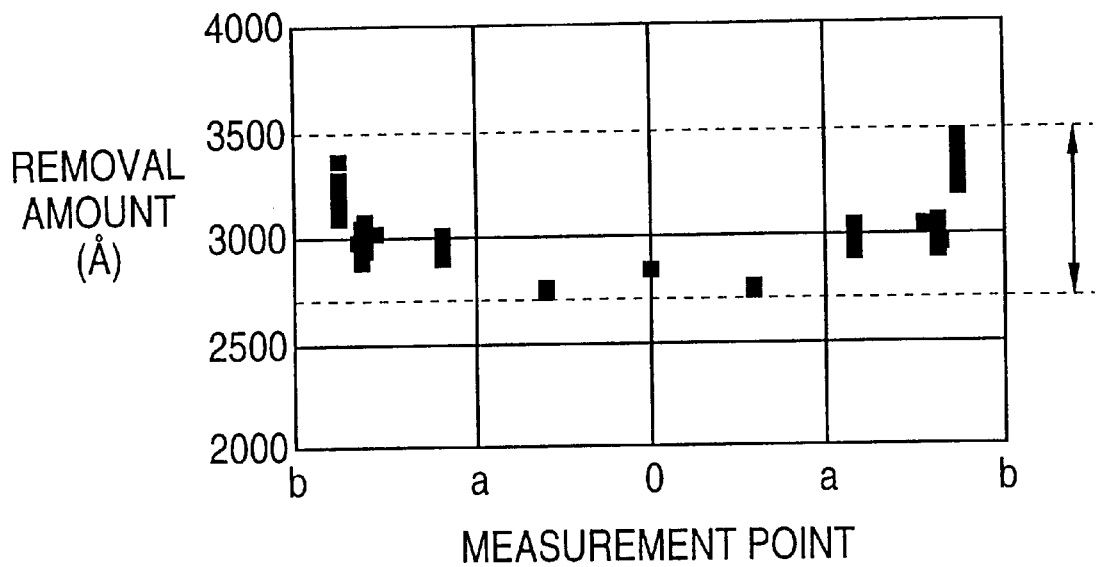
FIG. 9A is a graph showing the distribution of removal amount across the entire region of a wafer after being polished without setting a proper tilting angle.
Figure 9B:
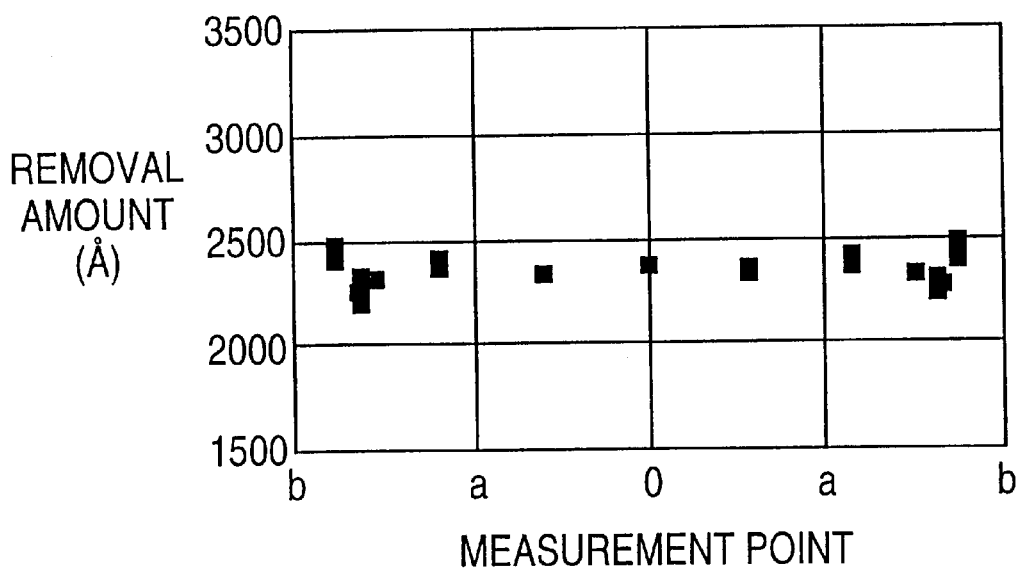
FIG. 9B is a graph showing the distribution of a removal amount across the wafer after being polished by setting a proper tilting angle .
Figure 9C:
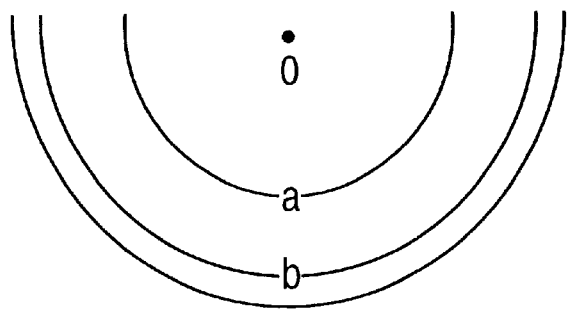
FIG. 9C is a plan view showing surface roughness measurement positions.

An example of evaluating the flatness uniformity on the basis of surface roughness measurements is shown in FIGS. 9A and 9C. FIG. 9A relates to a case of polishing without setting the tilt angle, and FIG. 9B relates to a case after setting the tilt angle to an optimum value. It can be seen that the optimum angle of tilt angle produces better flatness. FIG. 9C shows the positions where the measurements were taken. In the trial polishing, the parameters are set to be identical to those in an actual production polishing operation. Typical parameters are the types of object being polished object and polishing solution, rotational speeds of the turntable and top ring, and polish surface pressure, for example.

As described above, by setting the tilt angle of the rotation shaft 12 at a proper value, it is controlled by functions of the magnetic bearing assembly, i.e., by sensing the tilt angle from the output signals from the radial displacement sensors 18, 19 and adjusting the tilt of the rotation shaft 12 suitably. Thus, the polish surface pressure between the object surface and the abrading surface can be controlled uniformly across the area of contact.

Next, the steps of controlling the polish surface pressure will be explained. An optimum value of the polish surface pressure is also pre-determined by a trial polishing, and this reference value is entered as a reference value. As shown in FIG. 1, the elevator device 36 applies a vertical force on the casing 11, which is eventually transferred to the polish surface through the thrust bearing 13, rotation shaft 12 and the top ring 3. Here, the thrust bearing 13 is subjected to a reaction force of the polish surface pressing force. Thus, if a pressure variation is generated at the polish surface, this variation can be detected by the current flowing in the thrust bearing 13.

The relation between the pressing force F and the current through the coil 21a, 21b can be approximated by the following formula, where K is a coefficient, I a current, and F is a force:

$$F=KI.$$

F is computed from the above relation, and the pressing force values are compared. Adjustment values are forwarded to the elevator device 36 to adjust the pressure. It is also possible to adjust the current of the magnetic bearing assembly 10 itself to adjust the polish surface pressure. In this case, the control current through the thrust coils 21a, 21b is used as the parameter for the polish surface pressure control.

Figure 8:
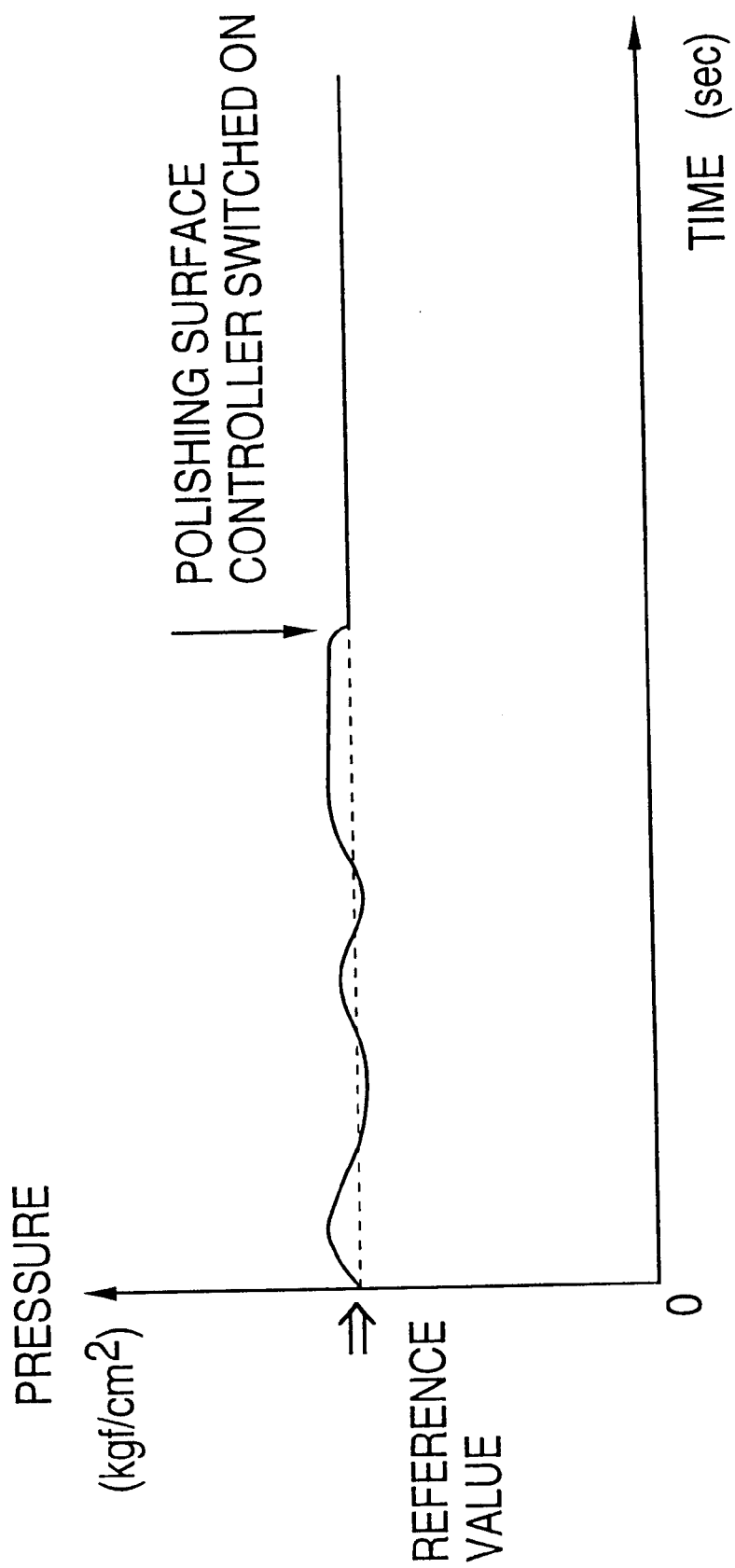
FIG. 8 is a graph showing variations in the polish surface pressure with duration of polishing before and after the application of a polish surface pressure control operation.

The polish surface pressure control steps for adjusting the polish surface pressure will be explained with reference to FIG. 7. The polish surface pressure controller 23 detects the magnitude of the control current in the thrust bearing 13 in the driving circuit 24 (st1), and the polish surface pressure controller 23 computes the force acting on the rotation shaft 12 according to output data from the displacement sensor 34 and the control current (st2). In this case, if the levitated position is unchanged, the value of K in st2 in the flowchart will not change. The computed polish surface pressure is compared with the reference value (st3), and if the result is not within the allowable range, a correction pressure is computed (st4). The elevator device 36 is operated according to the computed correction pressure, and the position of the entire bearing assembly 10 is adjusted (st5). The process is returned to st1, and the process is repeatedly performed until the difference between the computed and measured values of the polish surface pressure are in the allowable range. A polishing operation is carried out through the above described process under a pre-determined proper polish surface pressure. The polish surface pressure variation during such process is illustrated in FIG. 8.

The responsiveness of the control arrangement depends on the drive mechanism of the elevator device 36. If the drive comprises a ball screw mechanism operated by a stepping motor, the adjustment is carried out mechanically and the polish surface pressure is adjusted indirectly, so that the responsiveness is not too fast and is able to deal with slowly changing polish surface-pressures. Instead of such an elevator device 36, it is permissible to control the position of the top ring 3 by applying the computed value of control current to the thrust bearing 13 so as to directly control the operating current value through the magnetic bearing coil 21a, 21b, i.e. control of thrust force. Because the magnetic control method is more direct than the mechanical control technique, the control responsiveness is superior.

Other embodiments according to the present invention will be described with reference to the FIGS. 10 to 18B.

Figure 10:
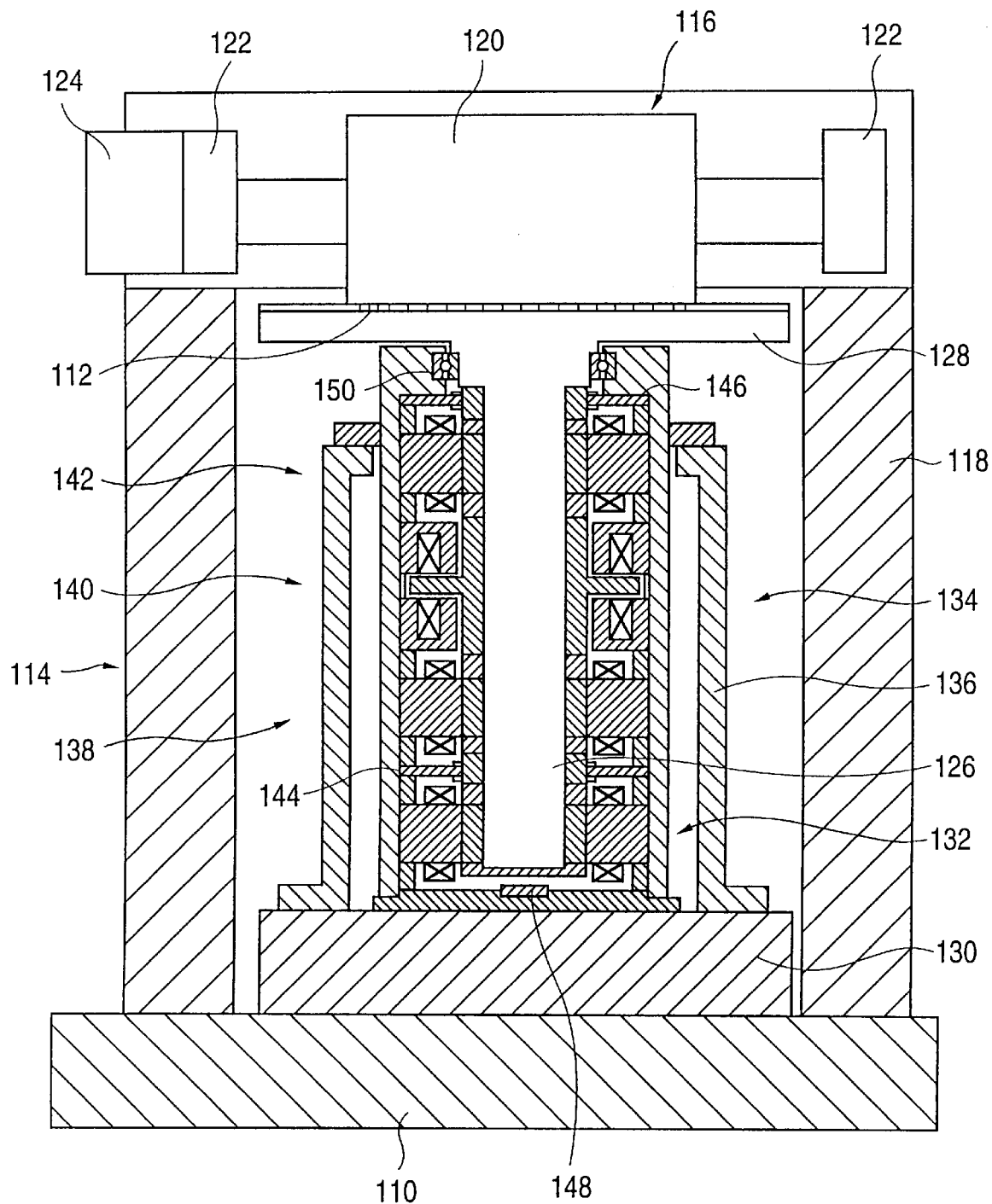
FIG. 10 is a vertical cross sectional view of a second embodiment of the polishing apparatus of the present invention.

As shown in FIG. 10, the polishing apparatus according to the second embodiment comprises: a base 110; workpiece supporting device 114 to support a workpiece (object to be polished) 112; a polishing tool 116 for polishing the workpiece 112; and a polishing solution supply pipe (not shown) to supply a polishing solution containing abrasive particles to the contacting surfaces of the workpiece 112 and the polishing tool 116.

The polishing tool 116 comprises a frame member 118 erected on the base 110 to support a drum 120 on which a polishing pad or a grinding stone is mounted, in such a way that the drum axis is horizontal and the drum is rotatable about the axis. The elastic strength of the drum 120 is chosen so that it will not deflect under normal working conditions by being supported at both ends in bearings 122. A drum motor 124 is provided above the frame member 118 for rotating the drum 120 through reduction gears. The base 110 is fixed on an installation floor through an unshown leveler so as to be able to adjust the level of base 110.

The workpiece supporting device 114 comprises a pedestal member 128 having a shaft member 126 below and holding workpiece 112 above; a pedestal motor 132 disposed on an x-y table 130 with the shaft member 126 acting as its rotor shaft; and a magnetic bearing device 134 for support of the rotating shaft member 126. The x-y table 130 is a positioning table for moving the workpiece 112 in directions transverse and lateral to the drum axis. The pedestal 128 is provided with a vacuum suction device to firmly hold the workpiece 112 thereon.

The pedestal motor 132 and the magnetic bearing device 134 are assembled into a cylindrical casing 136 disposed on top of the x-y table 130. Device 134 includes a movable section attached to the outer periphery of the shaft member 126 and a stationary section assembled inside of the casing 136. The components are, successively from the bottom, the pedestal motor 132, a lower radial magnetic bearing 138, a thrust magnetic bearing 140, an upper radial magnetic bearing 142. In the vicinity of each of the radial magnetic bearings 138, 142, radial sensors 144, 146 are respectively provided, and near the x-y table 130 opposite to the bottom end of the shaft member 126, an thrust sensor 148 is provided. Also, a touch-down or emergency bearing 150 is provided directly below the pedestal member 128.

Figure 11:
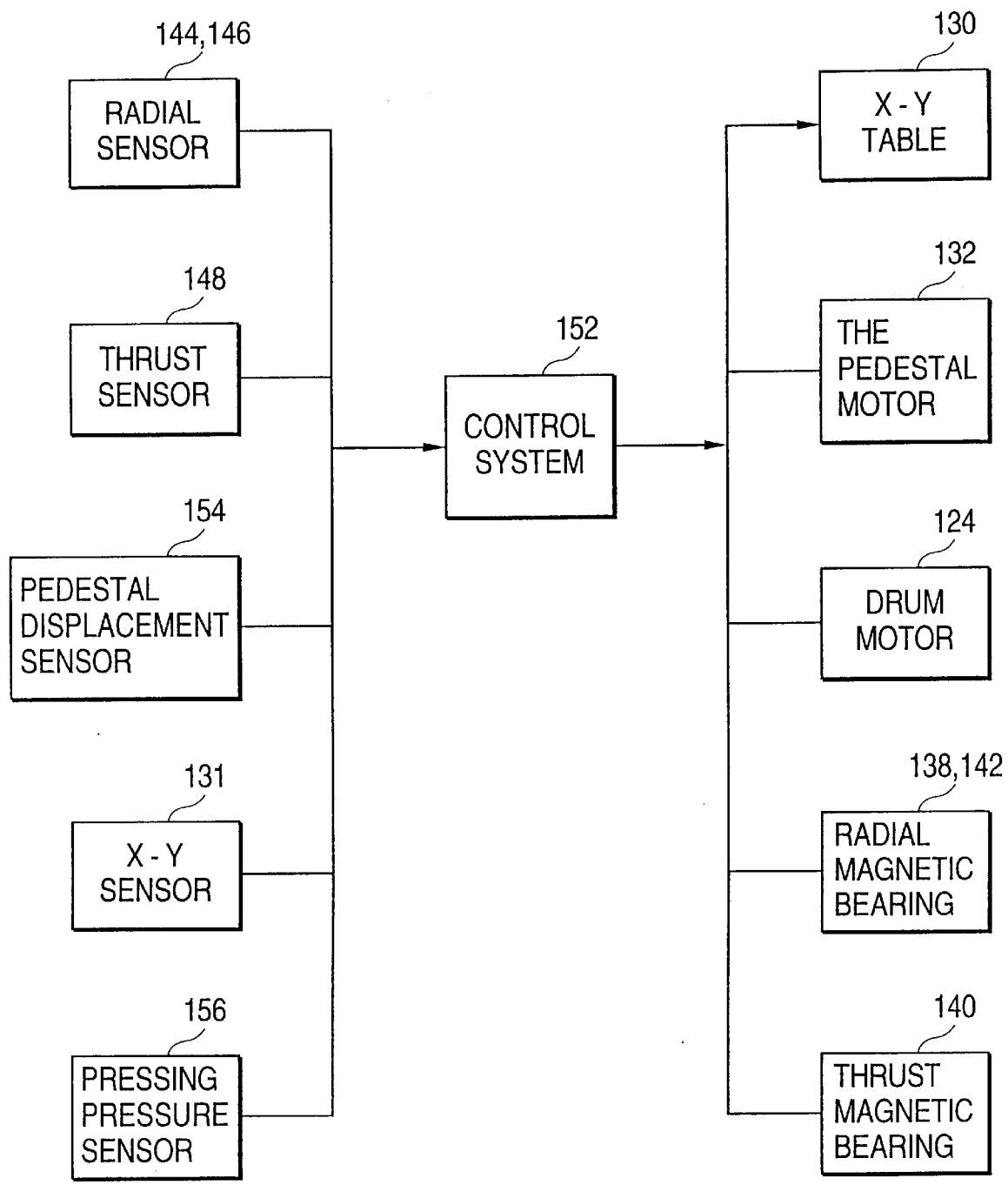
FIG. 11 is a block diagram of an example of a control device to control the polishing apparatus.

FIG. 11 shows a block diagram of control system 152 for such polishing apparatus. The control system 152 receives signals from radial sensor 144, 146; thrust sensors 148; a pedestal displacement sensor 154 which will be described later; an x-y sensor 131 for sensing the displacement of the x-y table 130; and a pressing pressure sensor 156 which will be described later. The output signals from the control system 152 are output to each of driving circuits for the x-y table 130, pedestal motor 132, drum motor 124, radial magnetic bearings 138, 142 and the thrust magnetic bearing 140.

Figure 12:
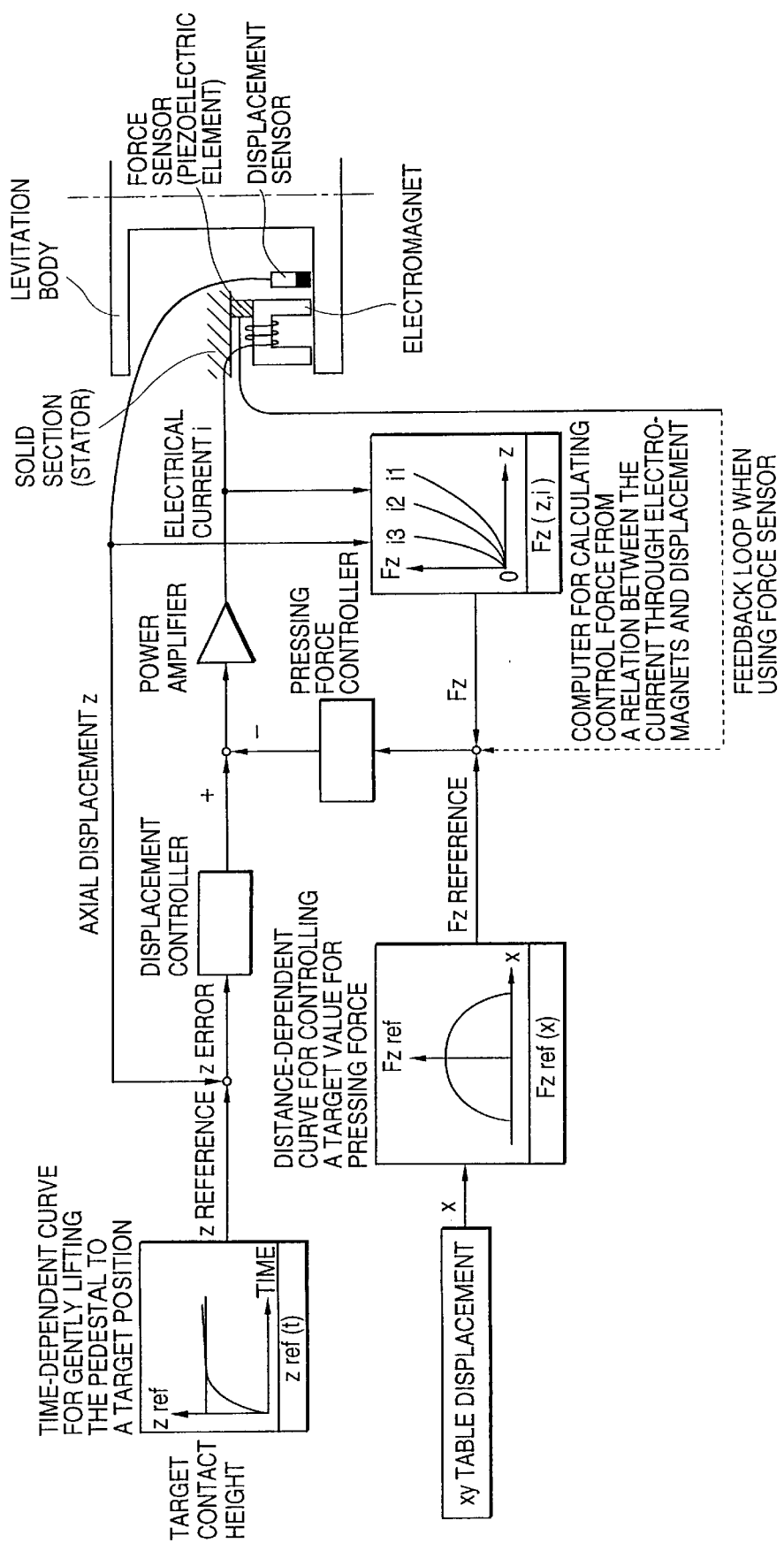
FIG. 12 is a schematic representation of the control device shown in FIG. 11.

As shown in an illustration presented in FIG. 12, the following three control functions are performed by the magnetic bearing device 134 which freely rotatably levitates the pedestal 128.

(1) Parallelism control: this function controls the horizontal orientation of the pedestal member 128 with respect to the axis of the drum 120.

(2) Levitation control: this function controls the uplifting of the pedestal member 128 at the start, by gently raising the pedestal member 128 toward the drum 120.

(3) Pressing force control: this function controls the pressing force of the drum 120 against the workpiece 112 during the polishing operation.

Each of these functions will be described below.

(1) Parallelism Control

Figure 13:
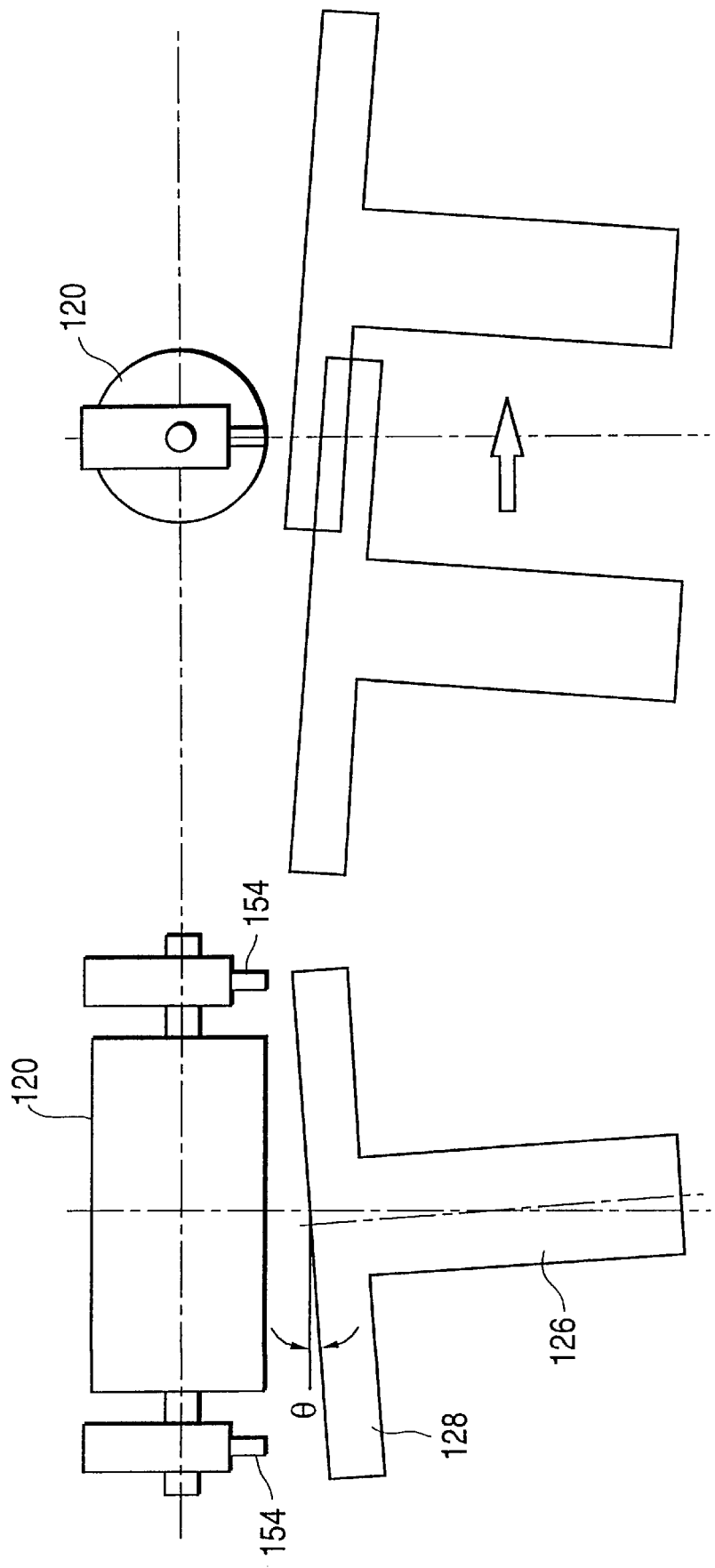
FIG. 13 is an illustration of the operation of a level-holding device.

As shown in FIG. 13, displacement sensor 154 is installed on each end of the drum 120 opposite to the pedestal member 128. The shaft member 126 is levitated to a position and then moved in the x- and y-directions using the x-y table 130. During such process, tilt angles θ x and θ y of the pedestal member 128 area calculated from the stored horizontal displacement before and after such movement. From these angles data, the standard positions of the upper and lower radial bearings 138, 142 in the x- and y-directions are calculated, and any deviations from the standard positions are adjusted automatically by generating offsetting position adjustment values for one or both of the bearings 138, 142 so that the pedestal member 128 will always be orientated level with respect to the edge line of the drum 120. By directly measuring the distance between the drum 120 and the pedestal member 128 to adjust the parallelism therebetween, a uniform contact between the polishing tool 116 and the workpiece 112 can always be maintained, even if the axis of the drum 120 itself is not level.

(2) Levitation Control

The thrust magnetic bearing 140 enables the pedestal member 128 to be lifted gently at the time of shaft levitation operation, to prevent possible damage to the workpiece 112 by sudden impact of the drum 120 against the workpiece 112.

To achieve gentle lifting during startup, the pedestal member 128 is first lifted temporarily into a position, and then, without setting a thrust reference position, the shaft member 126 is slowly lifted according to a time-dependent curve as shown in FIG. 12, so that the workpiece 112 comes into intimate contact with the drum 120. To shorten the startup time as much as possible, it is preferable that, during the initial phase, the time-dependent curve may be given a constant steep gradient or an accelerating steep curve, and after the pedestal has come close to the reference position, the rise rate is moderated.

(3) Pressing Force Control

To control the pressing force, it is necessary to measure he pressing force with a sensor or compute the pressing force on the basis of displacement or current data. Once the value of the pressing force has been determined, the input current to the thrust bearing 140 then can be adjusted according to feedback data from the thrust bearing 140.

The pressing force may also be adjusted according to the position of the x-y table 130. For this purpose, the positional referential data of the x-y table 130 is pre-determined and input into the controller, so that the pressing force may be adjusted according to a data table containing the referential value of the pressing force. By adopting this approach, the current can be altered depending on the length of contact between the workpiece 112 and the polishing tool 116 so that the object surface is always under a constant pressing pressure.

The pressing force may be controlled in one of two ways by using (a) hardware or (b) software, as explained below.

(a) Using hardware

The electromagnets in the thrust magnetic bearing 140 are affected by the force of reaction to the pressing force of the drum, and this reaction force can be measured. The sensor 156 for sensing this reaction force may be piezoelectric elements or strain gages. These sensors may be installed between the thrust electromagnets and the spacer.

(b) Using software

The pressing force may be determined from computations, without directly measuring the pressing force, from the displacement data in the thrust direction and the current flowing in the electromagnets in the thrust magnetic bearing 140. This method can be practiced without changing the structural configuration of the polishing apparatus, but in order to determine the pressing force accurately, it is necessary to have firm data regarding the operating characteristics of the electromagnets (i.e. relation between the thrust displacement and current).

The embodiment above was based on a system for levitating the pedestal member 128 for holding the workpiece 112 by the magnetic bearing device 134, however, it is obvious that the electromagnetic support structure can also be applied to the drum 120. The magnetic support devices may also be placed on both the pedestal side and the drum side of the apparatus. The rotation of the pedestal member 128 is carried out by pedestal motor 132 assembled into the magnetic bearing device.

FIG. 14 shows an example of a compact design of the magnetic bearing structure having an integral type of motor 158 which combines the separate functions of the lower radial bearing 138 and the pedestal motor 132 into a single unit.

Figure 15A:
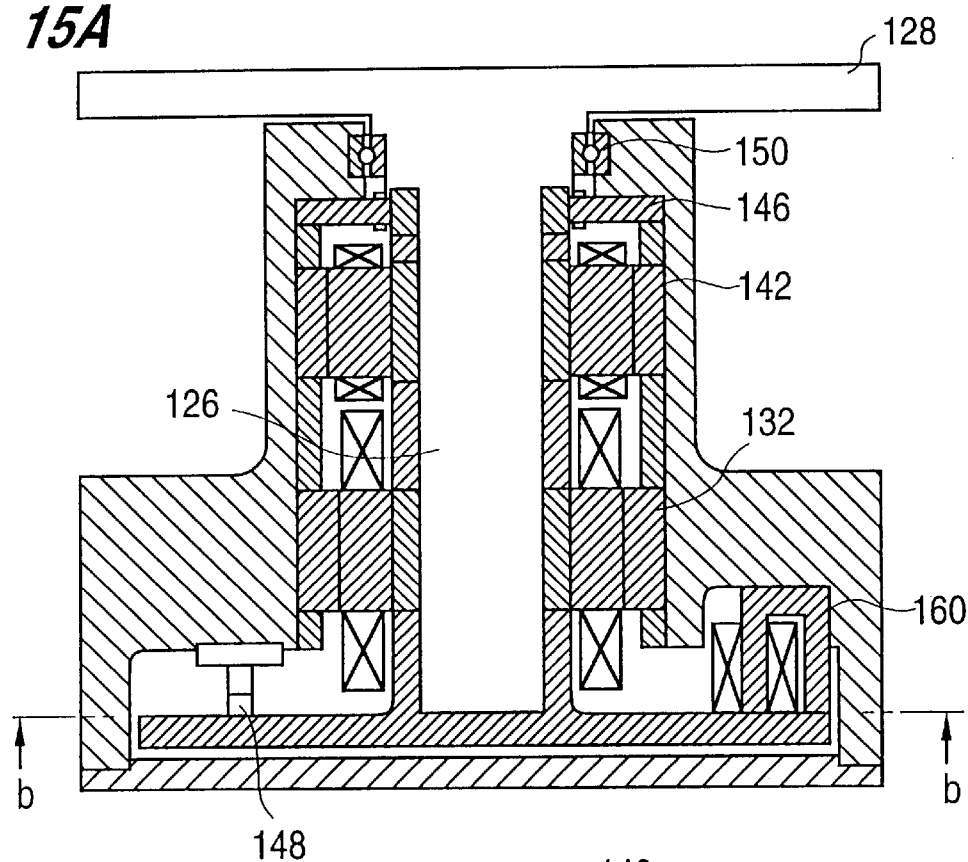
FIG. 15A is a vertical cross sectional view of another embodiment of the polishing apparatus.
Figure 15B:
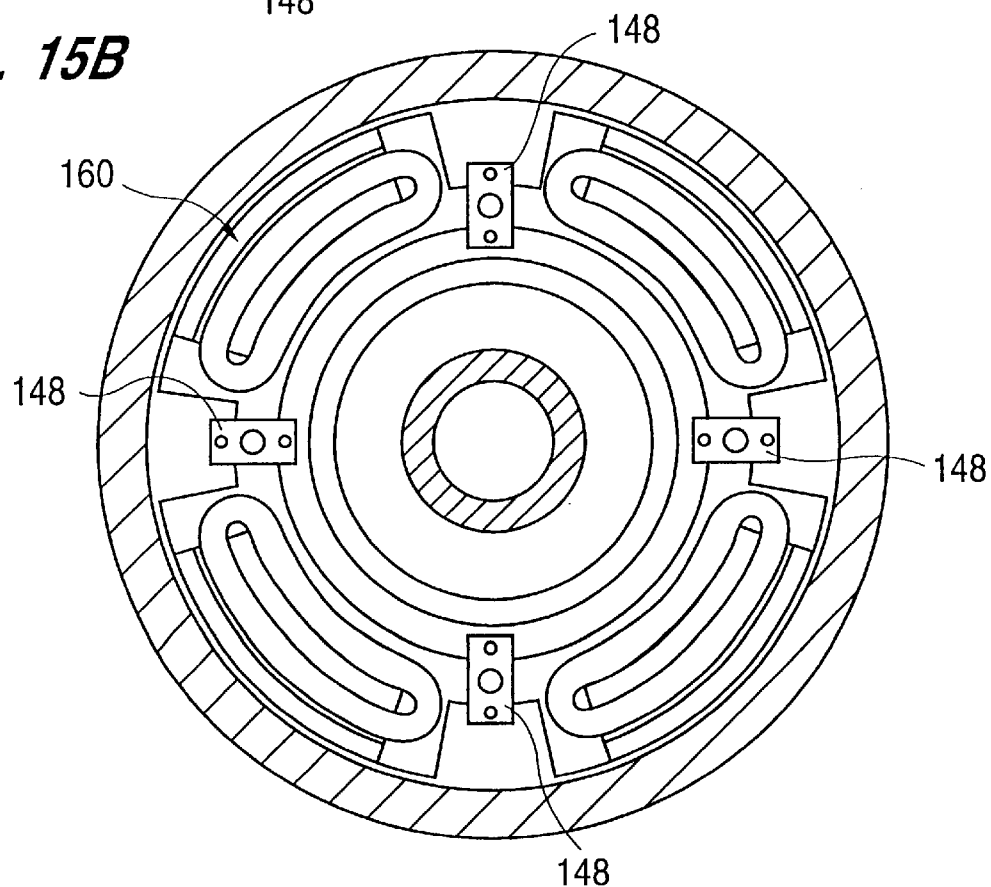
FIG. 15B is a horizontal cross sectional view of another embodiment of the polishing apparatus.

FIGS. 15A and 15B show another example in which the lower radial bearing has been eliminated with a combined function bearing 160 which is disposed at the bottom, and is able to adjust thrust displacement and tilt at the same time so that the tilt and the pressing force can be adjusted adequately.

In any of the control devices presented above, the basic function of the magnetic bearing device 134 is to detect the position of the levitated object by sensors, adjust the current in the coils of the electromagnets according to a differential signal between the reference and current positions, and maintain the position of the levitated object. For example, in FIG. 10, the pedestal member 128 is raised to the reference position and held there by the actions of the upper radial magnetic bearing 142, lower radial magnetic bearing 138, thrust bearing 140, in association with respective sensors 146, 144, and 148, so that the position of the pedestal member 128 in the radial and thrust directions can be determined. Therefore, it is possible to maintain the position and orientation of the pedestal member 128 by specifying a suitable referential value.

Figure 16A:
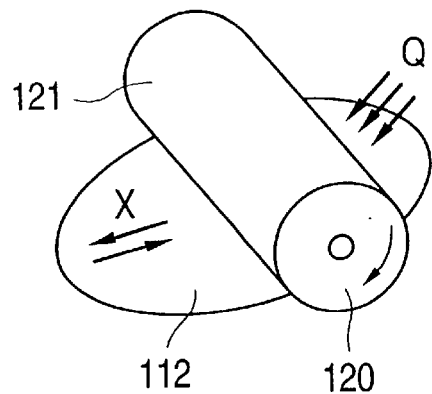
FIG. 16A is a perspective view of operation of a drum type polishing apparatus.
Figure 16B:
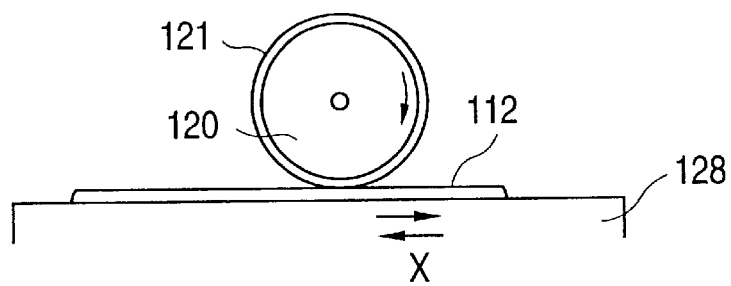
FIG. 16B is a cross sectional view operation of the drum type polishing apparatus.
Figure 16C:
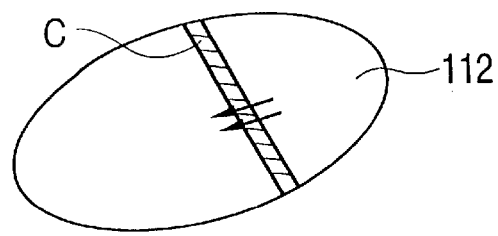
FIG. 16C is a perspective view of a contact interface C where the wafer meets the abrading surface of the drum in a drum type polishing apparatus.

FIGS. 16A–16C illustrate the basic operations of the polishing apparatus. As shown in FIGS. 16A and 16B, the drum 120 having a polishing pad 121 mounted on its outer surface is rotated about its axis to polish the surface of a workpiece 112. As shown in FIG. 16C, the contact interface is formed along a line. By moving the pedestal member 128 in the x-direction with respect to the drum 120, whose axis extends in the y-direction, the entire surface of the workpiece 112 may be polished under a uniform pressures.

This arrangement of the polishing apparatus enables the apparatus to be operated in a relatively small installation space, which will accommodate the drum 120 and the pedestal moving device. Therefore, compared with the conventional polishing apparatuses, the present polishing apparatus becomes significantly more compact and light in weight. Further, because the object surface is visually observable from above, the amount of removed material and the thickness of film remaining on the object surface can always be confirmed during the polishing operation.

Figure 17A:
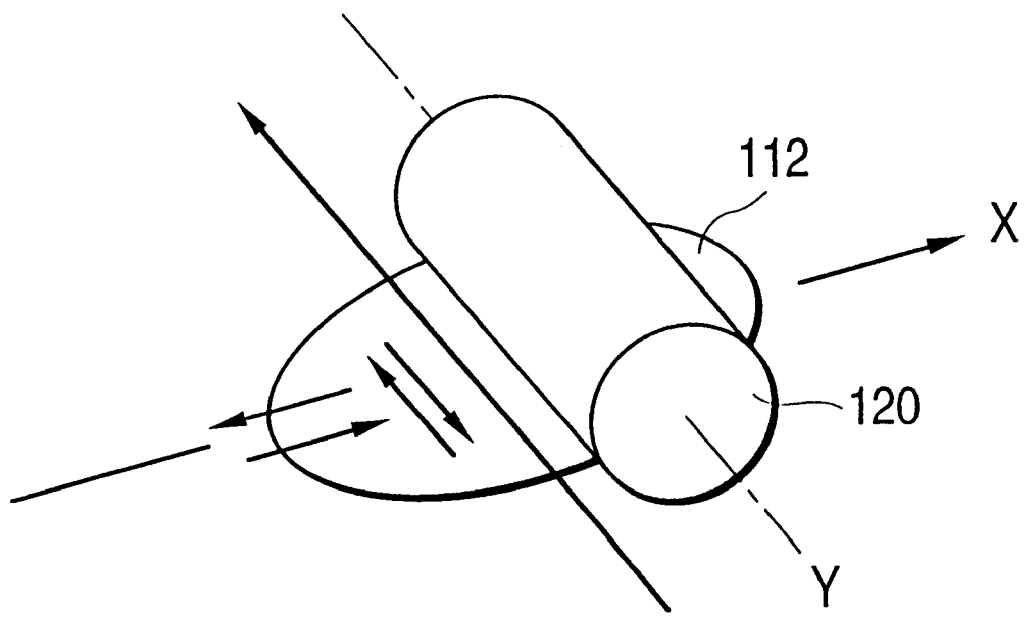
FIG. 17A is an illustration of operation of a pedestal moving device based on transverse movements of the wafer.

The performance of the pedestal moving device for moving the pedestal member 128 carrying the workpiece 112 will be explained with reference to FIGS. 17A and 17B. If the axis of the drum 120 is made stationary, and the movement is based only on a transverse motion (x-direction which is transverse to y-direction) of the pedestal member 128, surface irregularity will be produced when there is uneven pressing pressure distribution. As shown in FIG. 17A, a combined movement along lateral (y–) and transverse (x–) directions can prevent the formation of object surface irregularities. The example shows a case of moving the pedestal member 128, but the same effects are obtained when the drum 120 is moved in a similar manner.

Figure 17B:
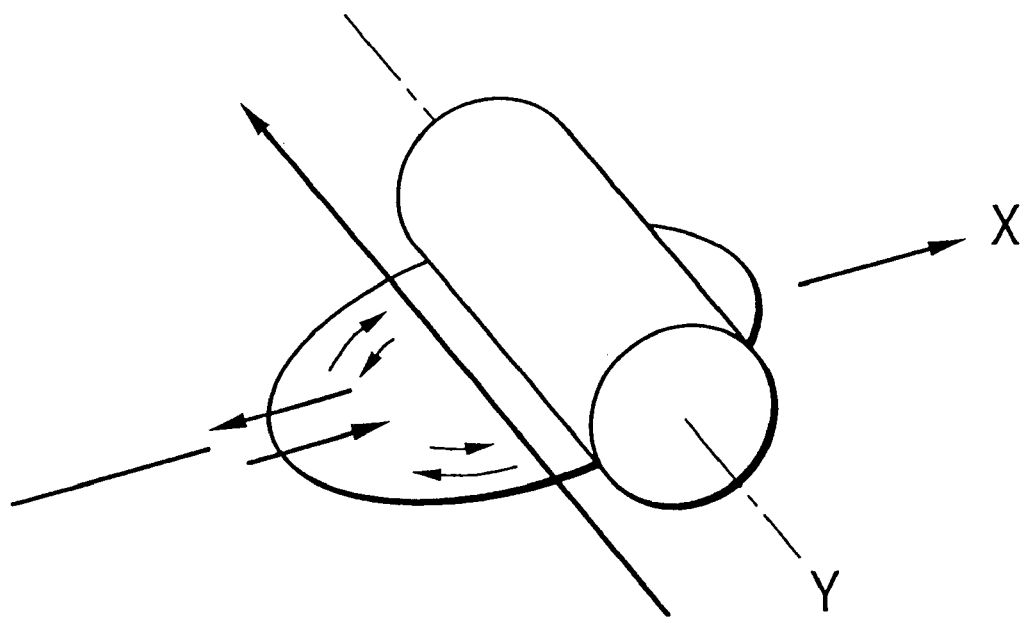
FIG. 17B is an illustration of operation of the pedestal moving device based on a combination of transverse and lateral movements.

FIG. 17B illustrates a case of a combined swing motions of the rotary sections, i.e. wafer 112 and a sacrificial plate. That is, the pedestal member 128 can be rotated with the pedestal motor 132 so that an oscillating swing motion of the pedestal member 128 can be achieved. Therefore, the combined movement of the x-y table 130 with the swing motion of the pedestal member 128 further prevents the formation of object surface irregularities.

In general, the removal rate Qp of the material by a polishing process is proportional to: a pressing pressure P at the contacting surfaces of the drum 120 and the workpiece 112; a relative speed V or rotational drum speed V' between the polishing pad and the workpiece 112; and the polishing duration T. That is, Qp is given by:

$$Qp=\eta \times P \times V \times T$$

as described earlier, where η is a constant of proportionality.

Because polishing is performed in an area of contacting surfaces of the polishing pad on the rotating drum and the workpiece, when polishing a circular object, such as a semiconductor wafer, the contact length L changes as the drum moves over the surface of the wafer. Therefore, when the pressing force is kept constant, the pressing pressure changes depending on the location of the drum on the wafer, leading to non-uniform across the surface of the polishing object.

In other words, in the central region of the wafer, the contact length L is long, and in the peripheral region of the wafer, the contact length L is short. Therefore, when the pressing force is kept constant, the pressing pressure in the peripheral region becomes higher relative to the central region, and the value of Qp becomes large.

Figure 18A:
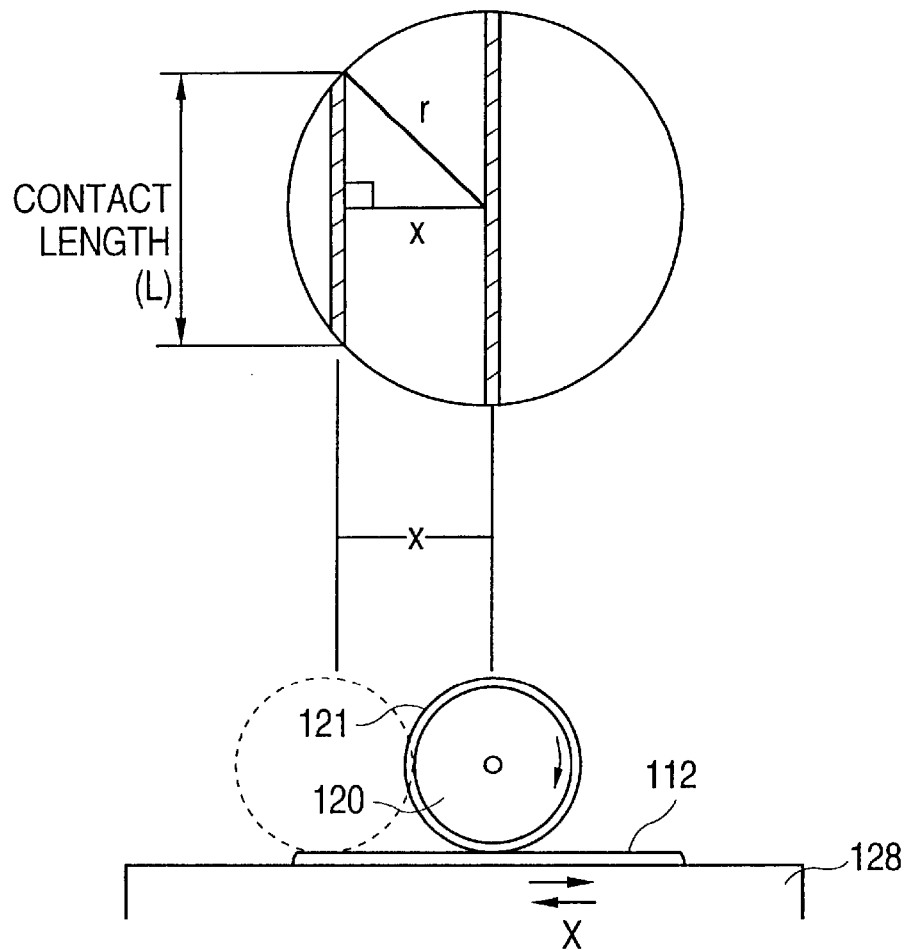
FIG. 18A is an illustration of the relation between a contact length L and a drum position on an object to be polished.
Figure 18B:
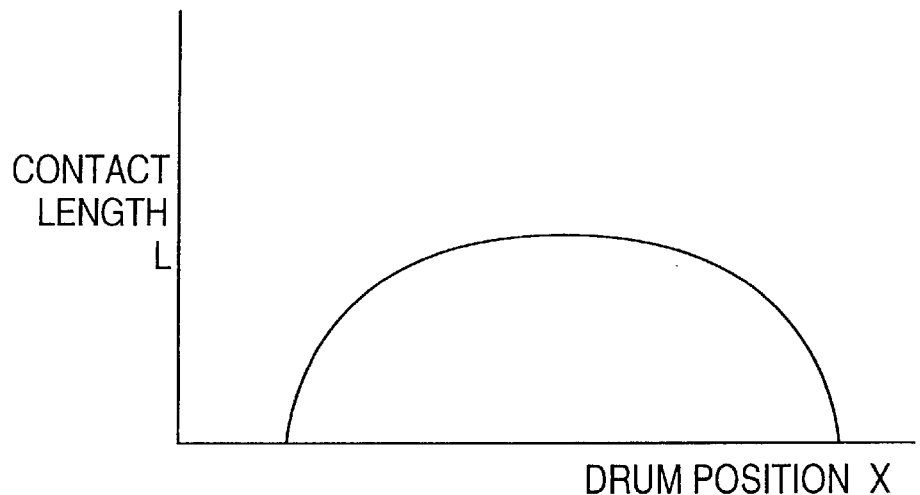
FIG. 18B is a graph portraying the drum position x and contact length L.
Figure 19:
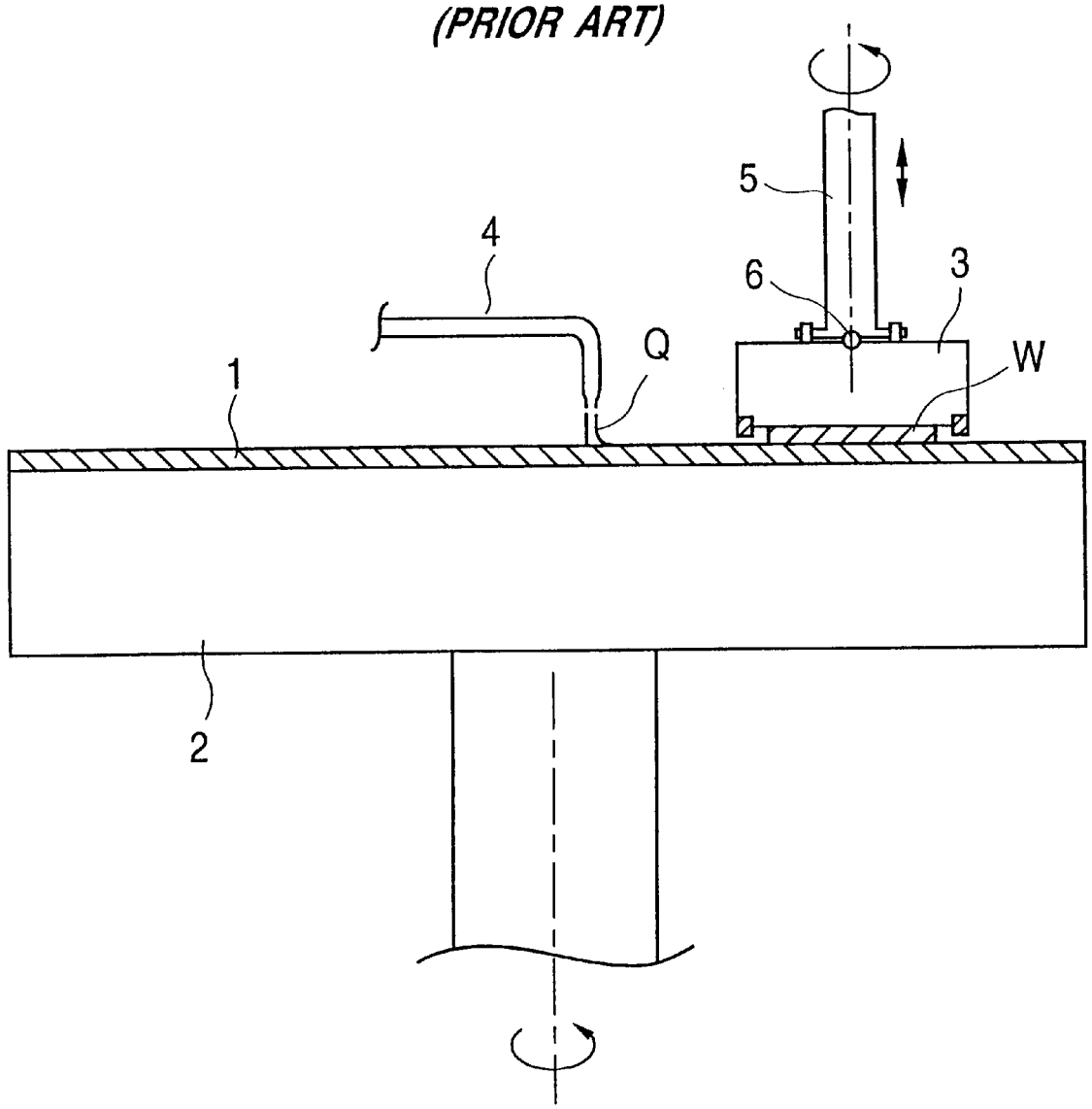
FIG. 19 is a schematic illustration of a conventional polishing apparatus.
Figure 20A:
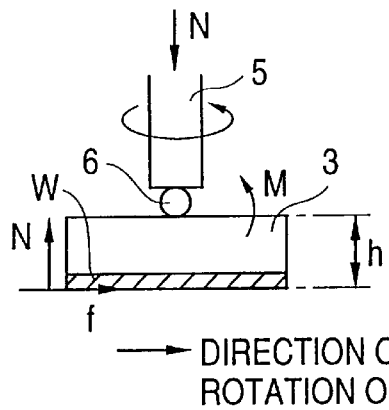
FIG. 20A~E illustrate various effects introduced by the conventional polishing apparatus shown in FIG. 19.
Figure 20B:
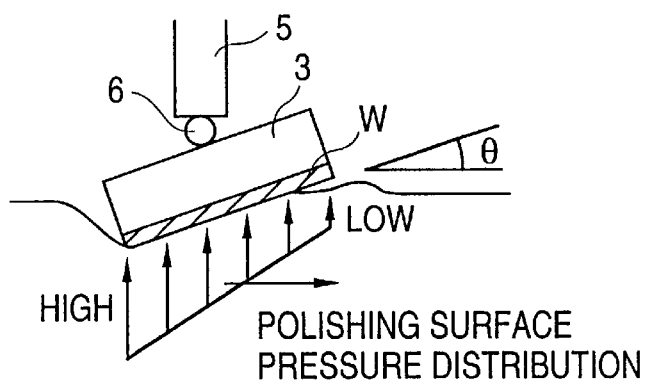
Figure 20D:
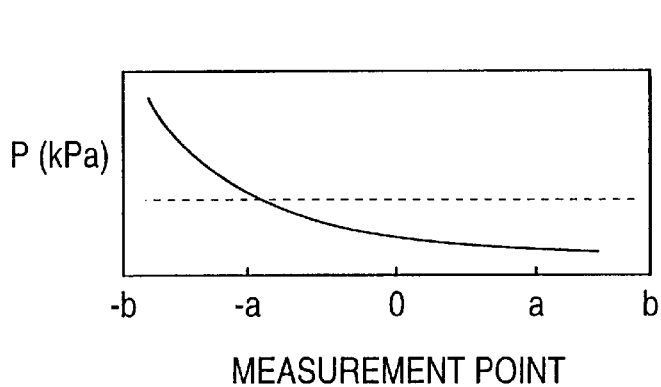
Figure 20C:
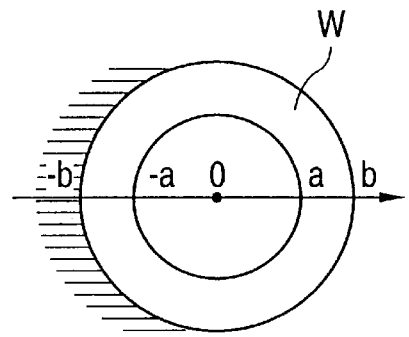
Figure 20E:
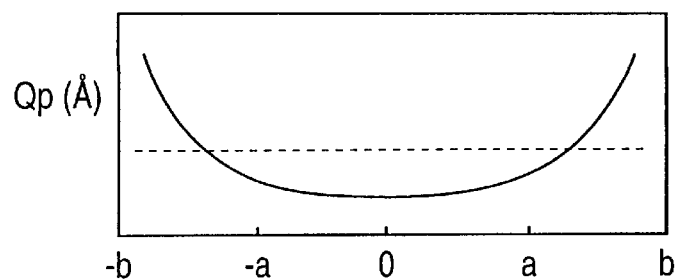

In an embodiment of the invention, a remedial approach is taken to compensate for the varying lengths L by suitably varying the pressing pressure P or drum speed or relative speed V. The contact length L for a wafer of radius r, as shown in FIG. 18A, is given by:

$$L=2(r^2-x^2)^{1/2}.$$

The value of x is obtained from the value of movement of the x-y table 130. The relation between the contact length L and x is expressed as a curve shown in FIG. 18B.

Designating the pressing force by S, the contact pressure P is given by:

$$P=\delta S/L=\delta S/2(r^2-x^2)^{1/2}$$

where δ is a constant. Therefore, by controlling the force S such that $$S=\epsilon L$$

where ϵ is a constant, a constant pressure P can be generated regardless of the contact length L so that uniform polishing can be achieved over the entire surface of the wafer.

Therefore, by incorporating the distance of movement x of the x-y table 130 in the control section, as shown in FIG. 12, computing the value of L from the distance x, and controlling the current supplied to the thrust magnetic bearing 140, the pressing pressure P between the workpiece 112 and the polishing pad 121 is:

$$S=\epsilon L=2\epsilon(r^2-x^2)^{1/2}.$$

By doing so, a constant pressure P can be applied at the contacting surfaces so that the amount Qp of material removed remains constant regardless of the value of the contact length L.

The relative speed of the drum 120 and the workpiece W can be deemed to be proportional to the rotation speed V' of the drum 120, whereas the rotational speed V' of the drum 120 can be controlled by supplying a rotation speed signal to the drum motor 124 from the control system. Therefore, by maintaining the pressing force S constant, and by controlling the drum speed V' according to:

$$V'=\zeta L=2\zeta(r^2-x^2)^{1/2}$$

where ζ is a constant, then, because $$Qp=\eta \times P \times V \times T$$

and $$P=\delta S/L,$$

a constant value of the removal amount Qp may be obtained regardless of the value of the contact length L.

In the above embodiments, the position of the top side of the apparatus including the drum 120 was fixed and the lower side of the apparatus including the pedestal member 128 with the workpiece was made to move to obtain uniform polishing on the polishing object. However, the lower side may be fixed in position and the top side may be moved to obtain equal effects.

What is claimed is:

1. A polishing apparatus for polishing a surface of an object to a high degree of flatness, said apparatus comprising:

a rotatable turntable having an abrading surface;

a rotatable top ring for holding the object surface against said abrading surface while said turntable and said top ring are rotated;

a magnetic bearing assembly rotatably supporting a rotation shaft of said top ring, said magnetic bearing assembly including at least one bearing device operable to change an angle of orientation of said rotation shaft; and an attitude controller connected to said magnetic bearing assembly and operable to control said angle of orientation of said rotation shaft and thereby to create an angle of inclination of the object surface relative to said abrading surface to be an optimum value to achieve a maximum degree of flatness of the polished object surface.

2. An apparatus as claimed in claim 1, wherein said abrading surface is formed by soft material.

3. An apparatus as claimed in claim 1, further comprising displacement sensors in said magnetic bearing assembly for detecting said orientation of said rotation shaft, and wherein said controller is operable in response to detection by said sensors.

4. An apparatus as claimed in claim 1, further comprising a polish surface pressure controller for controlling a magnitude of pressure acting between the object surface and said abrading surface.

5. An apparatus as claimed in claim 4, wherein said polish surface pressure controller is operable to estimate said magnitude of pressure as a function of electrical current supplied to said at least one bearing device.

6. An apparatus as claimed in claim 4, wherein said magnetic bearing assembly includes a thrust bearing device, and said polish surface pressure controller is operable to control said magnitude of pressure by controlling a magnetic excitation current supplied to said thrust bearing device.

7. An apparatus as claimed in claim 4, further comprising an elevator device for raising and lowering said magnetic bearing assembly, and said polish surface pressure controller is operable to control said elevator device.

8. An apparatus as claimed in claim 4, wherein said polish surface pressure controller is operable to control said magnitude of pressure to correspond to a predetermined pressure based on preliminary trial polishing operations.

9. An apparatus as claimed in claim 1, wherein said at least one bearing device comprises axially spaced radial bearing devices and a thrust bearing device.

10. An apparatus as claimed in claim 1, wherein said abrading surface is a surface of a polishing pad attached to a polishing pad attachment surface of said turntable.

11. A method of polishing a surface of an object to a high degree of flatness, said method comprising:

holding said object surface by a top ring against an abrading surface of a turntable while rotating said turntable and said top ring;

rotatably supporting a rotation shaft of said top ring by a magnetic bearing assembly including at least one bearing device; and controlling said magnetic bearing assembly to create an angle of orientation of said rotation shaft and thereby creating an angle of inclination of said object surface relative to said abrading surface to be an optimum value to achieve an optimum value to achieve a maximum degree of flatness of the polished object surface.

12. A method as claimed in claim 11, wherein said abrading surface is formed by soft material.

13. A method as claimed in claim 11, further comprising detecting said orientation of said rotation shaft by sensors in said magnetic bearing assembly, and wherein said controlling is in response to said detection by said sensors.

14. A method as claimed in claim 11, further comprising controlling a magnitude of pressure acting between said object surface and said abrading surface.

15. A method as claimed in claim 14, comprising estimating said magnitude of pressure as a function of electrical current supplied to said at least one bearing device.

16. A method as claimed in claim 14, wherein said magnetic bearing assembly includes a thrust bearing device, and said controlling said magnitude of pressure comprises controlling a magnetic excitation current supplied to said thrust bearing device.

17. A method as claimed in claim 14, wherein said controlling said magnitude of pressure comprises controlling raising and lowering of an elevator device supporting said magnetic bearing assembly.

18. A method as claimed in claim 14, comprising controlling said magnitude of pressure to correspond to a predetermined pressure based on preliminary trial polishing operations.

19. A method as claimed in claim 11, wherein said abrading surface is a surface of a polishing pad attached to a polishing pad attachment surface of said turntable.

20. A polishing apparatus for polishing a surface of an object to a high degree of flatness, said apparatus comprising:

a rotatable turntable having an abrading surface;

a rotatable top ring for holding the object surface against said abrading surface while said turntable and said top ring are rotated;

a magnetic bearing assembly rotatably supporting a rotation shaft of said top ring, said magnetic bearing assembly including at least one bearing device operable to change an angle of orientation of said rotation shaft; and a polish surface pressure controller connected to said magnetic bearing assembly and operable to control operation thereof to create a magnitude of pressure acting between the object surface and said abrading surface to be an optimum value to achieve a maximum degree of flatness of the polished object surface.

21. An apparatus as claimed in claim 20, wherein said polish surface pressure controller is operable to estimate said magnitude of pressure as a function of electrical current supplied to said at least one bearing device.

22. An apparatus as claimed in claim 20, wherein said magnetic bearing assembly includes a thrust bearing device, and said polish surface pressure controller is operable to control said magnitude of pressure by controlling a magnetic excitation current supplied to said thrust bearing device.

23. An apparatus as claimed in claim 20, further comprising an elevator device for raising and lowering said magnetic bearing assembly, and said polish surface pressure controller is operable to control said elevator device.

24. An apparatus as claimed in claim 20, wherein said polish surface pressure controller is operable to control said magnitude of pressure to correspond to a predetermined pressure based on preliminary trial polishing operations.

25. An apparatus as claimed in claim 20, wherein said at least one bearing device comprises axially spaced radial bearing devices and a thrust bearing device.

26. A method of polishing a surface of an object to a high degree of flatness, said method comprising:

holding said object surface by a top ring against an abrading surface of a turntable while rotating said turntable and said top ring;

rotatably supporting a rotation shaft of said top ring by a magnetic bearing assembly including at least one bearing device; and controlling said magnetic bearing assembly to create a magnitude of pressure acting between said object surface and said abrading surface to be an optimum value to achieve a maximum degree of flatness of the polished object surface.

27. A method as claimed in claim 26, comprising estimating said magnitude of pressure as a function of electrical current supplied to said at least one bearing device.

28. A method as claimed in claim 26, wherein said magnetic bearing assembly includes a thrust bearing device, and said controlling said magnitude of pressure comprises controlling a magnetic excitation current supplied to said thrust bearing device.

29. A method as claimed in claim 26, wherein said controlling said magnitude of pressure comprises controlling raising and lowering of an elevator device supporting said magnetic bearing assembly.

30. A method as claimed in claim 26, comprising controlling said magnitude of pressure to correspond to a predetermined pressure based on preliminary trial polishing operations.

31. A polishing apparatus for polishing a surface of an object to a high degree of flatness, said apparatus comprising:

a rotatable drum having an outer surface having a polishing section;

a driving device for rotating said drum;

a pedestal member for supporting the object with the surface thereof directed toward said drum;

a moving device for creating relative movement between said drum and said pedestal member in a plane to be substantially parallel to the object surface;

a pressing device for moving one of said drum and said pedestal member toward the other and thereby for creating a pressing force between said polishing section of said drum and the surface of the object supported by said pedestal member, said pressing device including a magnetic supporting assembly supporting said one of said drum and said pedestal member; and a controller operably connected to said magnetic supporting assembly and operable to control operation thereof to adjust said pressing force to an optimum value to achieve a maximum degree of flatness of the polished object surface.

32. An apparatus as claimed in claim 31, wherein said magnetic supporting assembly comprises a magnetic bearing assembly rotatably supporting a rotation shaft of said pedestal member.

33. An apparatus as claimed in claim 32, wherein said controller is operable to alter said pressing force in accordance with changes in area of surface contact between said polishing section of said drum and the object surface.

34. An apparatus as claimed in claim 33, wherein said controller is operable to alter said pressing force as a function of a length of said area of surface contact.

35. An apparatus as claimed in claim 32, further comprising a sensor positioned to detect tilting of said pedestal member and to generate a signal in response thereto, and said controller is operable to adjust said pressing force in response to said signal.

36. An apparatus as claimed in claim 32, wherein said magnetic bearing assembly includes at least one bearing device operable to move said pedestal device toward said drum, and said controller is operable to control said bearing device to control speed of movement of said pedestal device toward said drum.

37. An apparatus as claimed in claim 36, wherein said controller is operable during a start-up period of said apparatus to move said pedestal member toward said drum to achieve a gradual increase of said pressing force.

38. An apparatus as claimed in claim 32, wherein said controller is operable to control said pressing force by controlling a magnetic excitation current supplied to said magnetic bearing assembly.

39. An apparatus as claimed in claim 32, wherein said magnetic bearing assembly includes at least one radial bearing device and a motor combined into a single unit.

40. An apparatus as claimed in claim 32, wherein said magnetic bearing assembly includes a bearing device capable of achieving concurrent axial and radial displacements of.

41. An apparatus as claimed in claim 31, wherein said magnetic supporting assembly comprises a magnetic levitation assembly supporting said drum.

42. An apparatus as claimed in claim 41, wherein said controller is operable to alter said pressing force in accordance with changes in area of surface contact between said polishing section of said drum and the object surface.

43. An apparatus as claimed in claim 42, wherein said controller is operable to alter said pressing force as a function of a length of said area of surface contact.

44. An apparatus as claimed in claim 41, further comprising a sensor positioned to detect tilting of said drum and to generate a signal in response thereto, and said controller is operable to adjust said pressing force in response to said signal.

45. An apparatus as claimed in claim 41, wherein said magnetic levitation assembly includes at least one bearing device operable to move said drum toward said pedestal member, and said controller is operable to control said bearing device to control speed of movement of said drum toward said pedestal member.

46. An apparatus as claimed in claim 45, wherein said controller is operable during a start-up period of said apparatus to move said drum toward said pedestal member to achieve a gradual increase of said pressing force.

47. An apparatus as claimed in claim 41, wherein said controller is operable to control said pressing force by controlling a magnetic excitation current supplied to said magnetic levitation assembly.

48. An apparatus as claimed in claim 41, wherein said magnetic levitation assembly includes at least one radial bearing device and a motor combined into a single unit.

49. An apparatus as claimed in claim 41, wherein said magnetic levitation assembly includes a bearing device capable of achieving concurrent axial and radial displacements.

* * * * *